(12) United States Patent
Yamashita

(10) Patent No.: US 9,110,730 B2
(45) Date of Patent: Aug. 18, 2015

(54) COMMUNICATION METHOD AND COMMUNICATION APPARATUS

(75) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 13/490,162

(22) Filed: Jun. 6, 2012

(65) Prior Publication Data

US 2013/0055257 A1  Feb. 28, 2013

(30) Foreign Application Priority Data

Aug. 25, 2011  (JP) ................. 2011-183903

(51) Int. Cl.
*G06F 15/16* (2006.01)
*G06F 9/455* (2006.01)
*G06F 9/50* (2006.01)
*H04L 29/08* (2006.01)

(52) U.S. Cl.
CPC .............. *G06F 9/5077* (2013.01); *H04L 67/10* (2013.01); *G06F 9/45558* (2013.01)

(58) Field of Classification Search
CPC ....... G06F 15/16; G06F 9/54; G06F 9/45558; G06F 9/455; G06F 2009/4557; G06F 9/5077; G06F 15/173; H04L 67/10; H04L 49/1515; H04L 49/70; H04L 49/254; H04L 49/40; H04L 49/351; H04L 49/35; H04L 49/3072; H04L 49/356; H04L 12/56; H04L 12/462; H04L 49/00; H04L 49/1553; H04L 49/10; H04L 45/06; H04L 12/24; H04L 65/1083; H04L 65/80; H04J 3/24; H04W 36/0016; H04W 36/02; H04W 36/14; H04W 36/00; H04W 36/30

USPC ............................................... 709/226; 718/1
See application file for complete search history.

(56) References Cited

U.S. PATENT DOCUMENTS

| | | | |
|---|---|---|---|
| 8,213,336 B2 * | 7/2012 | Smith et al. | 370/254 |
| 2009/0172666 A1 * | 7/2009 | Yahalom et al. | 718/1 |
| 2010/0061394 A1 * | 3/2010 | Sindhu et al. | 370/422 |
| 2011/0002308 A1 * | 1/2011 | Nagasawa et al. | 370/332 |
| 2011/0225277 A1 * | 9/2011 | Freimuth et al. | 709/223 |
| 2011/0238816 A1 * | 9/2011 | Vohra et al. | 709/224 |
| 2011/0314155 A1 * | 12/2011 | Narayanaswamy et al. | 709/226 |
| 2012/0185848 A1 * | 7/2012 | Devarakonda et al. | 718/1 |
| 2013/0083701 A1 * | 4/2013 | Tomic et al. | 370/255 |

FOREIGN PATENT DOCUMENTS

| | | |
|---|---|---|
| JP | 2011-082799 | 4/2011 |
| WO | WO-2011/043317 A1 | 4/2011 |

* cited by examiner

*Primary Examiner* — Oleg Survillo
*Assistant Examiner* — Mehulkumar Shah
(74) *Attorney, Agent, or Firm* — Fujitsu Patent Center

(57) ABSTRACT

A gateway apparatus relays communication between first and second servers provided in a data center and an external communication apparatus located outside the data center. A control apparatus obtains an observation result obtained by observing a communication amount being an amount of data transmitted/received per unit time for each of virtual machines operating in the first and second servers in association with a transmission source and a destination of the data. When the first number of hops is smaller than the second number of hops, the control apparatus controls an arrangement of the virtual machines so that the virtual machine whose communication amount with the external communication apparatus is larger is more likely to be placated in the first server.

7 Claims, 23 Drawing Sheets

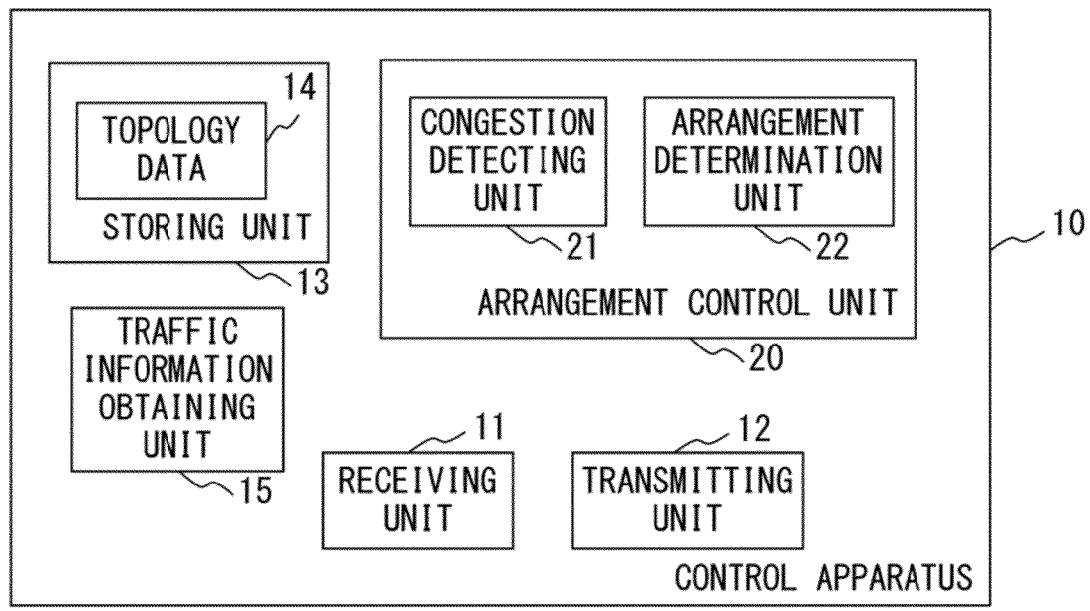
F I G. 2

|      | NUMBER OF HOPS FROM GW | SWITCH TO GO THROUGH | RELAY ROUTER TO GO THROUGH |
| ---- | --- | --- | --- |
| SV1  | 3 | SW1 | RT1 |
| SV2  | 3 | SW1 | RT1 |
| SV3  | 3 | SW2 | RT1 |
| SV4  | 3 | SW2 | RT1 |
| SV5  | 3 | SW3 | RT2 |
| SV6  | 3 | SW3 | RT2 |
| SV7  | 3 | SW4 | RT2 |
| SV8  | 3 | SW4 | RT2 |
| SV9  | 1 |     |     |
| SV10 | 1 |     |     |

FIG. 6

| PHYSICAL SERVER | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|
| SV1 | VM_A1 | DATA CENTER B | OUTSIDE | 4 | 4 | 0 | 4 |
| SV2 | VM_A2 | DATA CENTER B | OUTSIDE | 4 | 4 | 0 | 4 |
| SV3 | VM_A3 | DATA CENTER B | OUTSIDE | 4 | 4 | 0 | 4 |
| SV4 | VM_C1 | VM_C2 | SV5 | 3 | 0 | 3 | 3 |
| SV5 | VM_C2 | VM_C1 | SV4 | 3 | 0 | 3 | 6 |
| | | VM_C3 | SV6 | 3 | | | |
| SV6 | VM_C3 | VM_C2 | SV5 | 3 | 0 | 3 | 3 |
| SV7 | VM_B1 | VM_B2 | SV8 | 1 | 5 | 1 | 6 |
| | | OFFICE A | OUTSIDE | 5 | | | |
| SV8 | VM_B2 | VM_B1 | SV7 | 1 | 2 | 1 | 3 |
| | | OFFICE A | OUTSIDE | 2 | | | |
| SV9 | | | | 0 | 0 | 0 | 0 |
| SV10 | | | | 0 | 0 | 0 | 0 |

SERVER GROUP 2: SV1–SV8
SERVER GROUP 1: SV9–SV10

F I G. 7

| PHYSICAL SERVER | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|
| SV1 | VM_A1 | DATA CENTER B | OUTSIDE | 4 | 4 | 0 | 4 |
| SV2 | VM_A2 | DATA CENTER B | OUTSIDE | 4 | 4 | 0 | 4 |
| SV3 | | | | 0 | 0 | 0 | 0 |
| SV4 | VM_C1 | VM_C2 | SV5 | 3 | 0 | 3 | 3 |
| SV5 | VM_C2 | VM_C1 | SV4 | 3 | 0 | 6 | 6 |
| | | VM_C3 | SV6 | 3 | | | |
| SV6 | VM_C3 | VM_C2 | SV5 | 3 | 0 | 3 | 3 |
| SV7 | VM_B1 | VM_B2 | SV8 | 1 | 5 | 1 | 6 |
| | | OFFICE A | OUTSIDE | 5 | | | |
| SV8 | VM_B2 | VM_B1 | SV7 | 1 | 2 | 1 | 3 |
| | | OFFICE A | OUTSIDE | 2 | | | |
| SV9 | VM_A3 | DATA CENTER B | OUTSIDE | 4 | 4 | 0 | 4 |
| SV10 | | | | 0 | 0 | 0 | 0 |

| | PHYSICAL SERVER | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|---|
| SERVER GROUP 2 | SV1 | VM_A1 | DATA CENTER B | OUTSIDE | 4 | 4 | 0 | 4 |
| | SV2 | VM_A2 | DATA CENTER B | OUTSIDE | 4 | 4 | 0 | 4 |
| | SV3 | | | | 0 | 0 | 0 | 0 |
| | SV4 | VM_C1 | VM_C2 | SV5 | 3 | 0 | 3 | 3 |
| | SV5 | VM_C2 | VM_C1 | SV4 | 3 | 0 | 6 | 6 |
| | | | VM_C3 | SV6 | 3 | | | |
| | SV6 | VM_C3 | VM_C2 | SV5 | 3 | 0 | 3 | 3 |
| | SV7 | | | | 0 | 0 | 0 | 0 |
| SERVER GROUP 1 | SV8 | VM_B2 | VM_B1 | SV10 | 1 | 2 | 1 | 3 |
| | | | OFFICE A | OUTSIDE | 2 | | | |
| | SV9 | VM_A3 | DATA CENTER B | OUTSIDE | 4 | 4 | 0 | 4 |
| | SV10 | VM_B1 | VM_B2 | SV8 | 1 | 5 | 1 | 6 |
| | | | OFFICE A | OUTSIDE | 5 | | | |

|  | PHYSICAL SERVER | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|---|
| SERVER GROUP 2 | SV1 | VM_A1 | DATA CENTER B | OUTSIDE | 4 | 4 | 0 | 4 |
| | SV2 | VM_A2 | DATA CENTER B | OUTSIDE | 4 | 4 | 0 | 4 |
| | SV3 | | | | 0 | 0 | 0 | 0 |
| | SV4 | | | | 0 | 0 | 0 | 0 |
| | SV5 | VM_C2 | VM_C1 | SV7 | 3 | 0 | 6 | 6 |
| | | | VM_C3 | SV6 | 3 | | | |
| | SV6 | VM_C3 | VM_C2 | SV5 | 3 | 0 | 3 | 3 |
| | SV7 | VM_C1 | VM_C2 | SV5 | 3 | 0 | 3 | 3 |
| | SV8 | VM_B2 | VM_B1 | SV10 | 1 | 2 | 1 | 3 |
| | | | OFFICE A | OUTSIDE | 2 | | | |
| SERVER GROUP 1 | SV9 | VM_A3 | DATA CENTER B | OUTSIDE | 4 | 4 | 0 | 4 |
| | SV10 | VM_B1 | VM_B2 | SV8 | 1 | 5 | 1 | 6 |
| | | | OFFICE A | OUTSIDE | 5 | | | |

F I G. 1 3

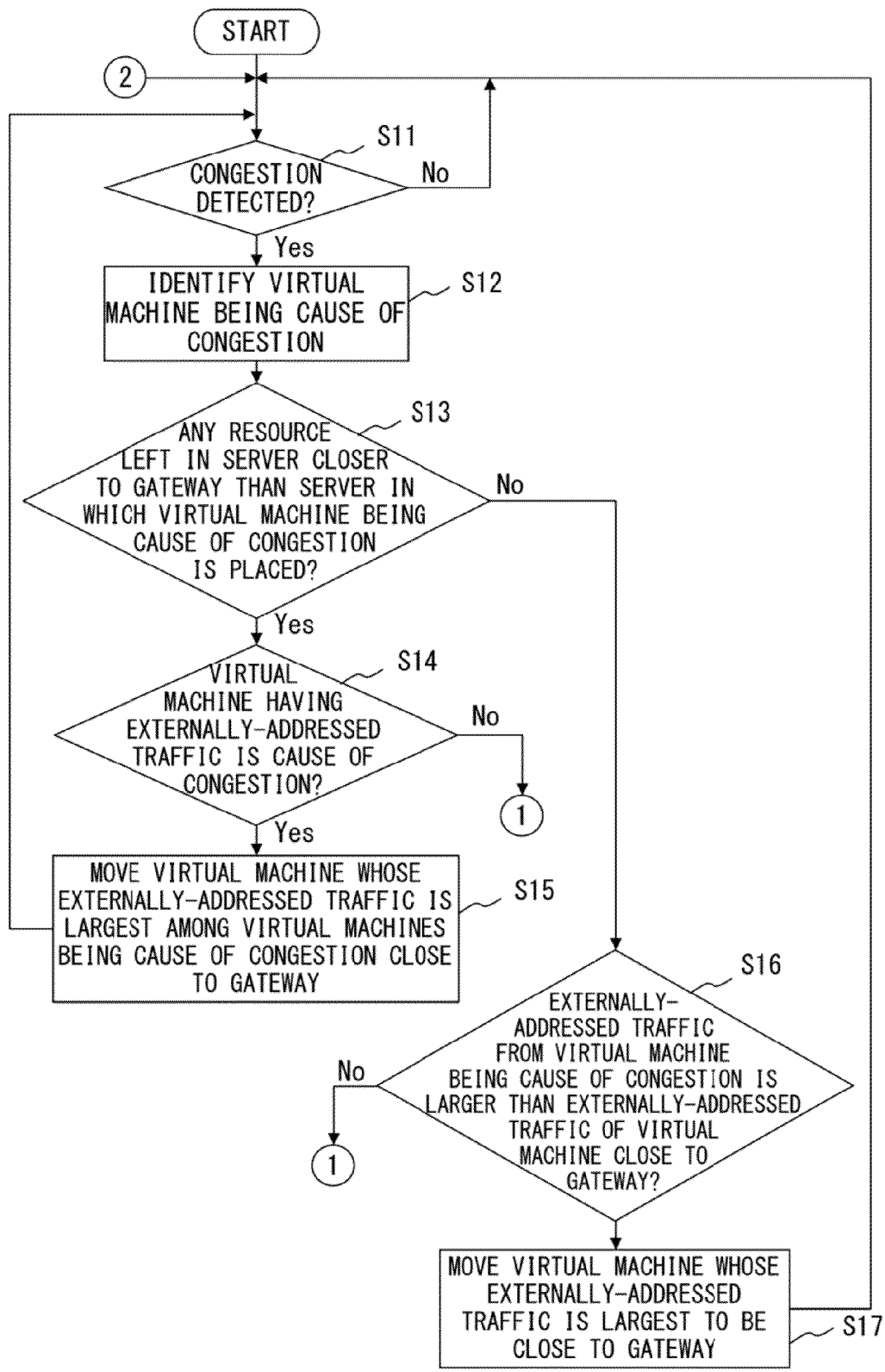
F I G. 15A

| PHYSICAL SERVER | | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|---|
| | SV1 | VM_D1 | DATA CENTER B | OUTSIDE | 5 | 5 | 0 | 5 |
| | SV2 | VM_D2 | DATA CENTER B | OUTSIDE | 5 | 5 | 0 | 5 |
| | SV3 | | | | 0 | 0 | 0 | 0 |
| | SV4 | | | | 0 | 0 | 0 | 0 |
| SERVER GROUP 2 | SV5 | VM_C2 | VM_C1 | SV7 | 3 | 0 | 6 | 6 |
| | | | VM_C3 | SV6 | 3 | | | |
| | SV6 | VM_C3 | VM_C2 | SV5 | 3 | 0 | 3 | 3 |
| | SV7 | VM_C1 | VM_C2 | SV5 | 3 | 0 | 3 | 3 |
| | SV8 | VM_B2 | VM_B1 | SV10 | 1 | 2 | 1 | 3 |
| | | | OFFICE A | OUTSIDE | 2 | | | |
| SERVER GROUP 1 | SV9 | VM_A3 | DATA CENTER B | OUTSIDE | 4 | 4 | 0 | 4 |
| | SV10 | VM_B1 | OFFICE A | OUTSIDE | 5 | 5 | 1 | 6 |
| | | | VM_B2 | SV8 | 1 | | | |

F I G. 1 8

| | PHYSICAL SERVER | PLACED VIRTUAL MACHINE | DESTINATION | PHYSICAL SERVER IN WHICH DESTINATION IS PLACED | TRAFFIC (Gbps) | EXTERNALLY-ADDRESSED TRAFFIC (Gbps) | INTERNALLY-ADDRESSED TRAFFIC (Gbps) | TOTAL TRAFFIC AMOUNT (Gbps) |
|---|---|---|---|---|---|---|---|---|
| SERVER GROUP 2 | SV1 | VM_D1 | DATA CENTER B | OUTSIDE | 5 | 5 | 0 | 5 |
| | SV2 | VM_A3 | DATA CENTER B | OUTSIDE | 4 | 4 | 0 | 4 |
| | SV3 | | | | 0 | 0 | 0 | 0 |
| | SV4 | | | | 0 | 0 | 0 | 0 |
| | SV5 | VM_C2 | VM_C1 | SV7 | 3 | 0 | 6 | 6 |
| | | | VM_C3 | SV6 | 3 | | | |
| | SV6 | VM_C3 | VM_C2 | SV5 | 3 | 0 | 3 | 3 |
| | SV7 | VM_C1 | VM_C2 | SV5 | 3 | 0 | 3 | 3 |
| | SV8 | VM_B2 | VM_B1 | SV10 | 1 | 2 | 1 | 3 |
| | | | OFFICE A | OUTSIDE | 2 | | | |
| SERVER GROUP 1 | SV9 | VM_D2 | DATA CENTER B | OUTSIDE | 5 | 5 | 0 | 5 |
| | SV10 | VM_B1 | OFFICE A | OUTSIDE | 5 | 5 | 1 | 6 |
| | | | VM_B2 | SV8 | 1 | | | |

FIG. 20

|  | HIGH DEGREE OF PRIORITY | LOW DEGREE OF PRIORITY |
|---|---|---|
| MAINLY COMMUNICATION OUTSIDE DATA CENTER | GROUP (a) ⇒PLACED IN SERVER GROUP1 (PLACED IN SERVER GROUP 2 WHEN THERE IS SHORTAGE IN AVAILABLE RESOURCE IN SERVER GROUP 1) GIVE PRIORITY TO VM WITH A WIDE BANDWIDTH | GROUP (c) ⇒AFTER PLACING GROUPS (a) (b), MONITOR AVAILABLE RESOURCE IN SERVER GROUP, AND PLACED IN SERVER GROUP 1 WITH PRIORITY UNTIL RESOURCE USAGE RATE IN EACH SERVER REACHES PRESCRIBED THRESHOLD. |
| MAINLY COMMUNICATION INSIDE DATA CENTER | GROUP (b) ⇒PLACED IN SERVER GROUP2 (PLACED IN SERVERS UNDER SAME SW, RT WITH PRIORITY) | GROUP (d) ⇒AFTER PLACING GROUPS (a) (b) (c), MONITOR AVAILABLE RESOURCE IN SERVER GROUP, AND PLACED IN SERVER GROUP 2 WITH PRIORITY UNTIL RESOURCE USAGE RATE IN EACH SERVER REACHES PRESCRIBED THRESHOLD. |

F I G. 2 1

COMMUNICATION METHOD AND COMMUNICATION APPARATUS

CROSS-REFERENCE TO RELATED APPLICATION

This application is based upon and claims the benefit of priority of the prior Japanese Patent Application No. 2011-183903, filed on Aug. 25, 2011, the entire contents of which are incorporated herein by reference.

FIELD

The present invention relates to communication in a network including a plurality of communication apparatuses.

BACKGROUND

In recent years, the cloud computing using a network and a virtual machine (VM) is becoming popular. A plurality of servers may be placed in a data center used for the cloud computing, and the virtual machine operates in the server. The virtual machine transmits/receives data used for executing an application and execution results of the application to/from other virtual machines and servers. For this reason, communication may be carried out between a plurality of virtual machines in a data center. Furthermore, there may be a case in which a virtual machine operating on a server placed in a data center A communicates with a virtual machine operating on a server placed in a data center B that is different from the data center A.

As a related technique, a system in which virtual machines that provides service are gathered in a server included in a prescribed rack in a server room has been invented. This system seeks to save power with the change of the arrangement of the virtual machines by stopping the rack with no operating server and by stopping the processing of the equipment in the room for the rack.

PRIOR ART DOCUMENT

Patent Document

[Patent document 1] Japanese Laid-open Patent Publication No. 2011-82799

As the cloud computing becomes popular, the amount of data transmitted/received in a data center and the amount of data transmitted/received between data centers have increased rapidly, and a system that is capable of coping with the increase in the communication amount has been in need. However, the amount of investment in equipment is also required to be held down.

SUMMARY

In a method according to an embodiment, a gateway apparatus relays communication between first and second servers provided in a data center and an external communication apparatus located outside the data center. A control apparatus obtains an observation result obtained by observing a communication amount being an amount of data transmitted/received per unit time for each of virtual machines operating in the first and second servers in association with a transmission source and a destination of the data. The control apparatus checks whether a first number of hops from the gateway apparatus to the first server is smaller than a second number of hops from the gateway apparatus to the first server. When the first number of hops is smaller than the second number of hops, the control apparatus controls an arrangement of the virtual machines so that the virtual machine whose communication amount with the external communication apparatus is larger is more likely to be placated in the first server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example of a functional block diagram of a control apparatus.

FIG. 6 is a table illustrating an example of topology data that a control apparatus has.

FIG. 7 is a diagram illustrating an example of traffic information that a traffic monitor obtains.

FIG. 9 is a diagram illustrating an example of traffic information.

FIG. 11 is a diagram illustrating an example of traffic information.

FIG. 13 is a diagram illustrating an example of traffic information.

FIG. 15A is a flowchart illustrating an example of a process when a congestion occurs.

FIG. 18 is a diagram illustrating an example of traffic information.

FIG. 20 is a diagram illustrating an example of traffic information.

FIG. 21 is a table illustrating an example of sorting of traffic and an arrangement policy.

DESCRIPTION OF EMBODIMENTS

Figure 1:
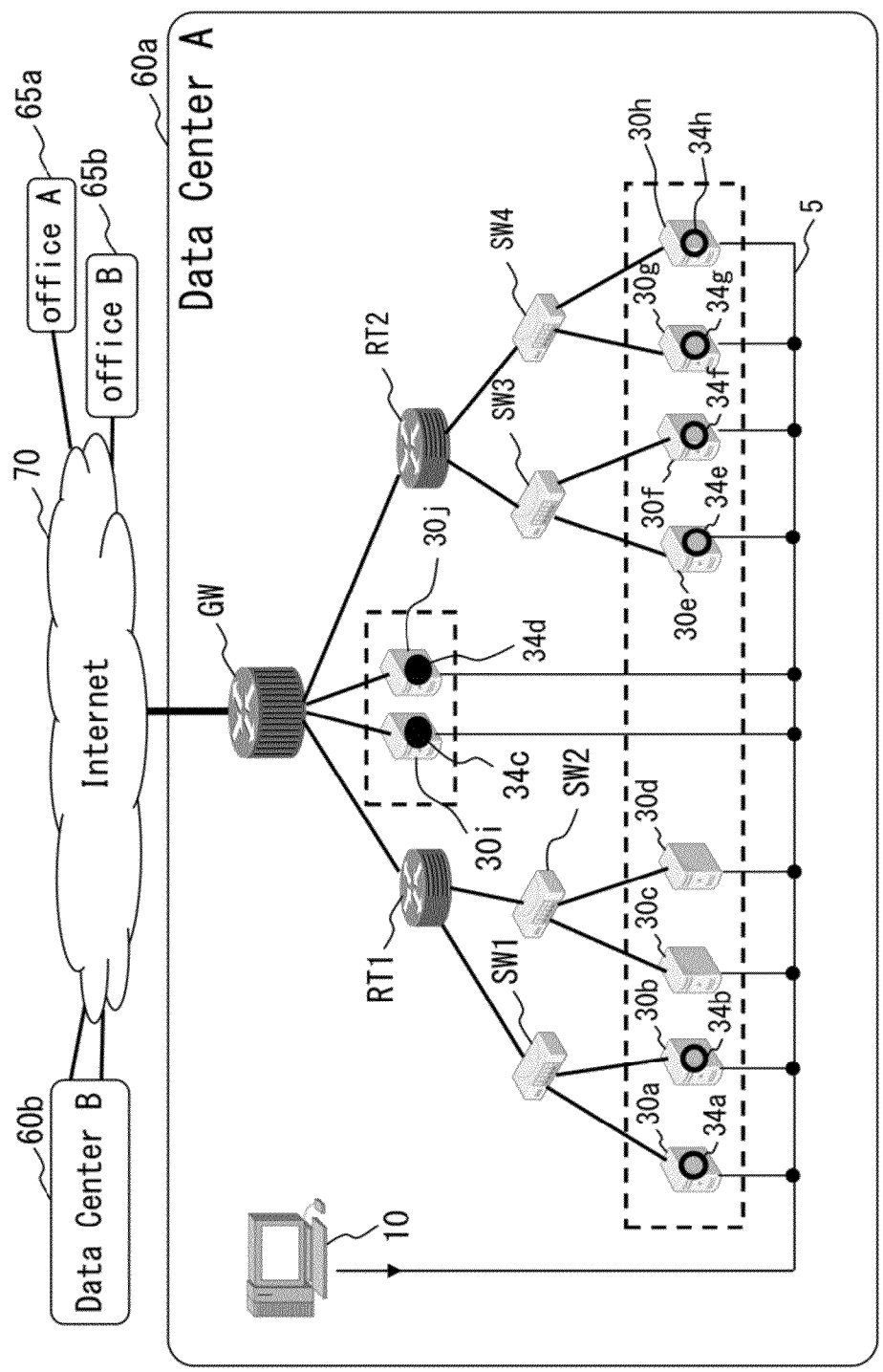
FIG. 1 is a diagram illustrating the arrangement of virtual machines in a data center.

FIG. 1 illustrates an example of the arrangement of virtual machines 34 in a data center 60a. The data center 60a has a gateway router (GW, gateway), relay routers (RT1, RT2), switches (SW1-SW4), a control apparatus 10, and servers 30 (30a-30j). A management network 5 includes the control unit 10 and the individual servers 30. The servers 30 included in the data center 60a communicated with a communication apparatus provided outside the data center 60a via the gateway router. In the explanation below, an apparatus that is not included in the data center 60a and communicates the apparatuses inside the data center 60a via the gateway GW may be described as an "external communication apparatus". The external communication apparatus includes, for example, a communication apparatus in an Internet 70, a communication apparatus in a data center 60b, offices 65 (65a, 65b) connected via the Internet 70. The virtual machines 34 (34a-34h) operates in the servers 30 (30a-30j). In the explanation below, for the purpose of facilitating understanding, the explanation is made with an example of a case in which one virtual machine 34 operates in one server 30, but an arbitrary number of virtual machines 34 may operate in an individual server 30. In addition, FIG. 1 illustrates an example of the data center 60, and the number of the gateway GW, relay routers RT, switches SW, servers 30 may be changed.

The control apparatus 10 has stored the connection relationship (topology data) of communication apparatuses included in the data center 60a such as the relay routes RT, switches SW, servers 30 in advance. It is assumed that the topology data is input to the control apparatus 10 by an operator and the like as needed.

The control unit 10 obtains traffic used for communication for each of the virtual machines 34 placed in the servers 30. In the explanation below, the amount of data that flows on the network per unit time may be descried as "traffic". In addition, in the explanation below, the amount of data that flows in a particular line per second is indicated by bps (bits Per Second). It is assumed that the control apparatus 10 may obtain observation results from an observation apparatus (not illustrated in the drawing) that observes the amount of data transmitted/received in each server, and may calculate the traffic based on the obtained data. Here, the observation apparatus is realized by any communication apparatus that is capable of obtaining information about traffic, and for example, may be realized by a traffic monitor (see FIG. 5) or a computer. In addition, before the operation of virtual machines starts, the control apparatus 10 calculates the traffic based on data input by an operator and the like. The control apparatus 10 calculates the communication amount between each of the virtual machines 34 placed in the server 30 and an external communication machine, based on information obtained from the observation apparatus or information input by an operator.

The control apparatus 10 controls the virtual machine 34 with a large communication amount with the external communication apparatus to be placed in the server 30 with a small number of hops from the gateway GW. For example, it is assumed that among the virtual machines 34a-34h, the virtual machine 34c has the largest traffic with the external communication apparatus, and the virtual machine 34d has the second largest traffic with the external communication apparatus. In the example in FIG. 1, the number of hops of the servers 30a-30h from the gateway GW is 3, while the number of hops of the servers 30i, 30j from the gateway GW is 1. Therefore, the control apparatus 10 controls the virtual machines 34c and 34d to be placed in the servers 30i, 30j and the virtual machines 34a, 34b, 34e-34h are placed in the servers 30a-30h. For example, the control apparatus 10 transmits control information to the virtual machine 34 whose arrangement is to be changed, via the management network 5.

The virtual machine 34 that received the control information moves to the server 30 specified by the control information. The movement of the virtual machine 34 is supposed to be performed by any live migration technique. Once the virtual machines 34c and 34d are placed in the servers 30i, 30j, data that the virtual machines 34c and 34d transmit to the external communication apparatus does not go through the relay apparatuses such as the relay routers RT1, RT2, switches SW1-SW4. Therefore, compared with a case in which the virtual machines 34c and 34d are placed in the servers 30a-30h, the traffic that may be transmitted/received inside the data center 60a increases.

As described above, since the virtual machine 34 with a large traffic with the external communication apparatus is placed in the server 30 with a small number of hops from the gateway GW with priority, the lines in the data center 60 are used efficiently.

<Apparatus Configuration>

FIG. 2 illustrates an example of a functional block diagram of the control apparatus 10. The control apparatus 10 has a receiving unit 11, a transmitting unit 12, a storing unit 13, a traffic information obtaining unit 15, and an arrangement control unit 20. The arrangement control unit 20 has a congestion detecting unit 21 and an arrangement determination unit 22. The receiving unit 11 receives data and the like transmitted from the observation apparatus and servers 30. The transmitting unit 12 transmits data and the like transmitted from the control apparatus 10 to the servers 30 or the observation apparatus. For example, the transmitting unit 12 transmits a control message for moving the virtual machine so as to be in the arrangement determined by the arrangement determination unit 22, to the server 30 in which the virtual machine is placed. The storing unit 13 has topology data 14, and other than that, stores data obtained by the process in the control apparatus 10 and the like, as needed. The topology data 14 is information that specifies the connection relationship between the communication apparatuses included in the data center 60. The traffic information obtaining unit 15 obtains information about traffic from the observation apparatus via the receiving unit 11. In the explanation below, the information related to traffic may be described as "traffic information".

The congestion detecting unit 21 calculates the traffic of each line included in the network of the data center 60 using the traffic information and the topology data 14, and detects the spot where congestion has occurred.

The arrangement determination unit 22 determines the arrangement of the virtual machines 34 in the servers 30. Before the operation of the data center 60 starts, the arrangement determination unit 22 determines the arrangement of the virtual machines 34 so that the virtual machine 34 with a larger traffic expected with the external communication apparatus is placed in the server 30 with a smaller number of hops from the gateway GW. Once the operation of the data center 60 starts and congestion occurs during operation, the arrangement determination unit 22 changes the arrangement of the virtual machine 34 based on the result of calculation in the congestion detecting unit 21. In this case, the arrangement determination unit 22 moves the virtual machine 34 with a large traffic with the external communication apparatus among the virtual machines 34 transmitting/receiving data via the line in which the congestion has occurred to the server 30 with a small number of hops from the gateway GW. The operation of the arrangement determination unit 22 is to be explained in detail later.

Figure 3:
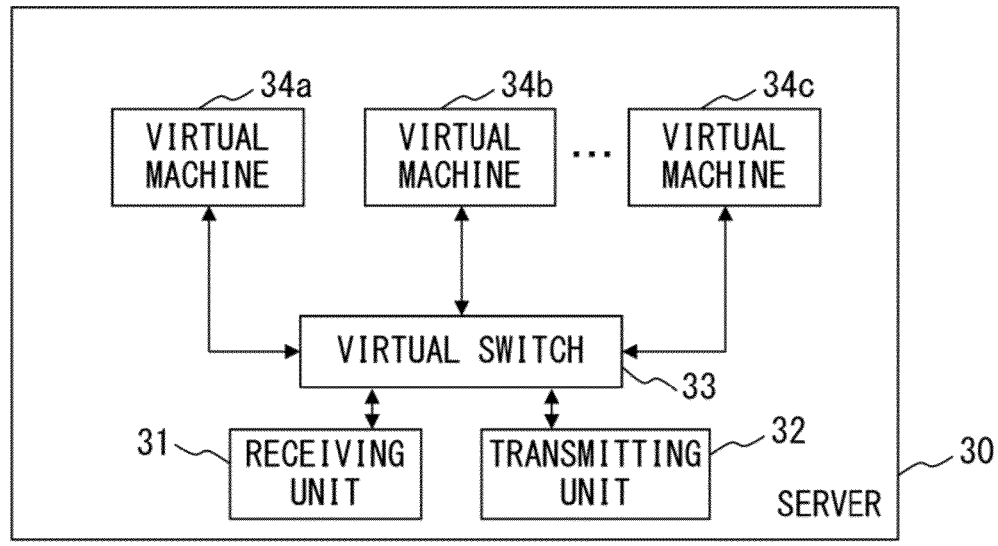
FIG. 3 is an example of a functional block diagram of a server.

FIG. 3 illustrates an example of a functional block diagram of the server 30. The server 30 has a receiving unit 31 and a transmitting unit 32, and is capable of operating a virtual switch 33 and virtual machines 34 (34a-34c). The receiving unit 31 receives data transmitted from the other servers 30, control apparatus 10 and external communication apparatus. The transmitting unit 32 transmits data to the other servers 30, the external communication apparatus and the like. In addition, data transmitted/received via the receiving unit 31 or the transmitting unit 32 are supposed to be observed by the observation apparatus by mirroring.

The virtual switch 33 connects the virtual machines 34a-34c to the receiving unit 31 and the transmitting unit 32. While three units of virtual machines 34 operate on the server 30 in the example in FIG. 3, the number of virtual machines 34 operate on one unit of the server 30 is arbitrary.

Figure 4:
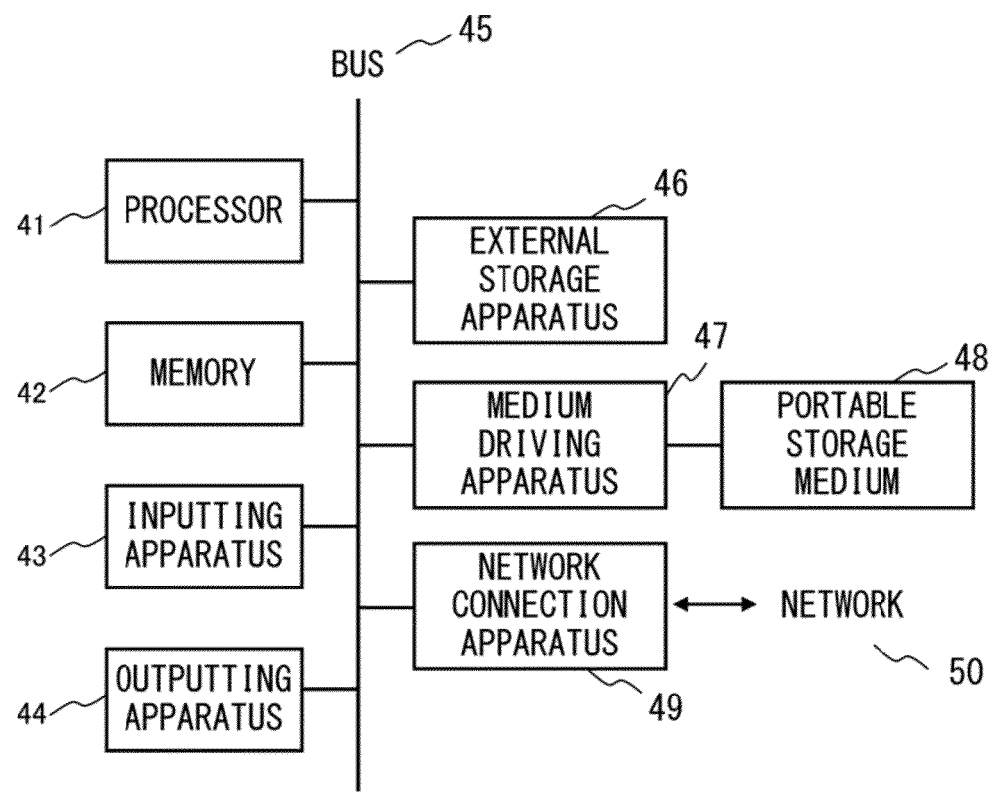
FIG. 4 is a diagram illustrating an example of a hardware configuration of a control apparatus and a server.

FIG. 4 illustrates an example of the hardware configuration of the control apparatus 10 and the server 30. Both the control apparatus 10 and the server 30 has a processor 41, a memory 42, an inputting apparatus 43, an outputting apparatus 44, a bus 45, an external storage apparatus 46, a medium driving apparatus 47, and a network connection apparatus 49. Here, processor 41 may be a Central Processing Unit (CPU). For example, both the control apparatus 10 and the server 30 may be realized by a computer. It is supposed that the observation apparatus may also be realized by a computer having hardware as illustrated in FIG. 4.

In the control apparatus 10, the processor 41 operates as the traffic information obtaining unit 15 and the arrangement control unit 20 by executing a program. The memory 42 operates as the storing unit 13. In addition, the control apparatus 10 may obtain data such as the topology data 14 and the traffic information from a network 50 or a portable storage medium 48. A network connection apparatus 49 operates as the receiving unit 11 and the transmitting unit 12.

On the other hand, in the server 30, the processor 41 operates as the virtual switch 33 and the virtual machine 34. In addition, the network connection apparatus 49 operates as the receiving unit 31 and the transmitting unit 32.

The inputting apparatus 43 is, for example, a button, a keyboard, a mouse and the like, and the operator may input the traffic information and the topology data 14 to the control apparatus 10 using the inputting apparatus 43. The outputting apparatus 44 is realized as a display and the like. The bus 45 connects between the processor 41, the memory 42, the inputting apparatus 43, the outputting apparatus 44, the external storage apparatus 46, the medium driving apparatus 47, the network connection apparatus 49 so that data may be received and given from/to each other. The external storage apparatus 46 stores a program and data and the like, and provides information stored to the processor 41 and the like as needed. The medium driving apparatus 47 is capable of transmitting data in the memory 42 and in the external storage apparatus 46 to the portable storage medium 48 and is also capable of reading out a program, data and the like from the portable storage medium 48. Here, the portable storage medium 48 may be any portable storage medium including a floppy disk, a Magneto-Optical (MO) disk, a Compact Disc Recordable (CD-R) and a Digital Versatile Disk Recordable (DVD-R).

<First Embodiment>

Figure 5:
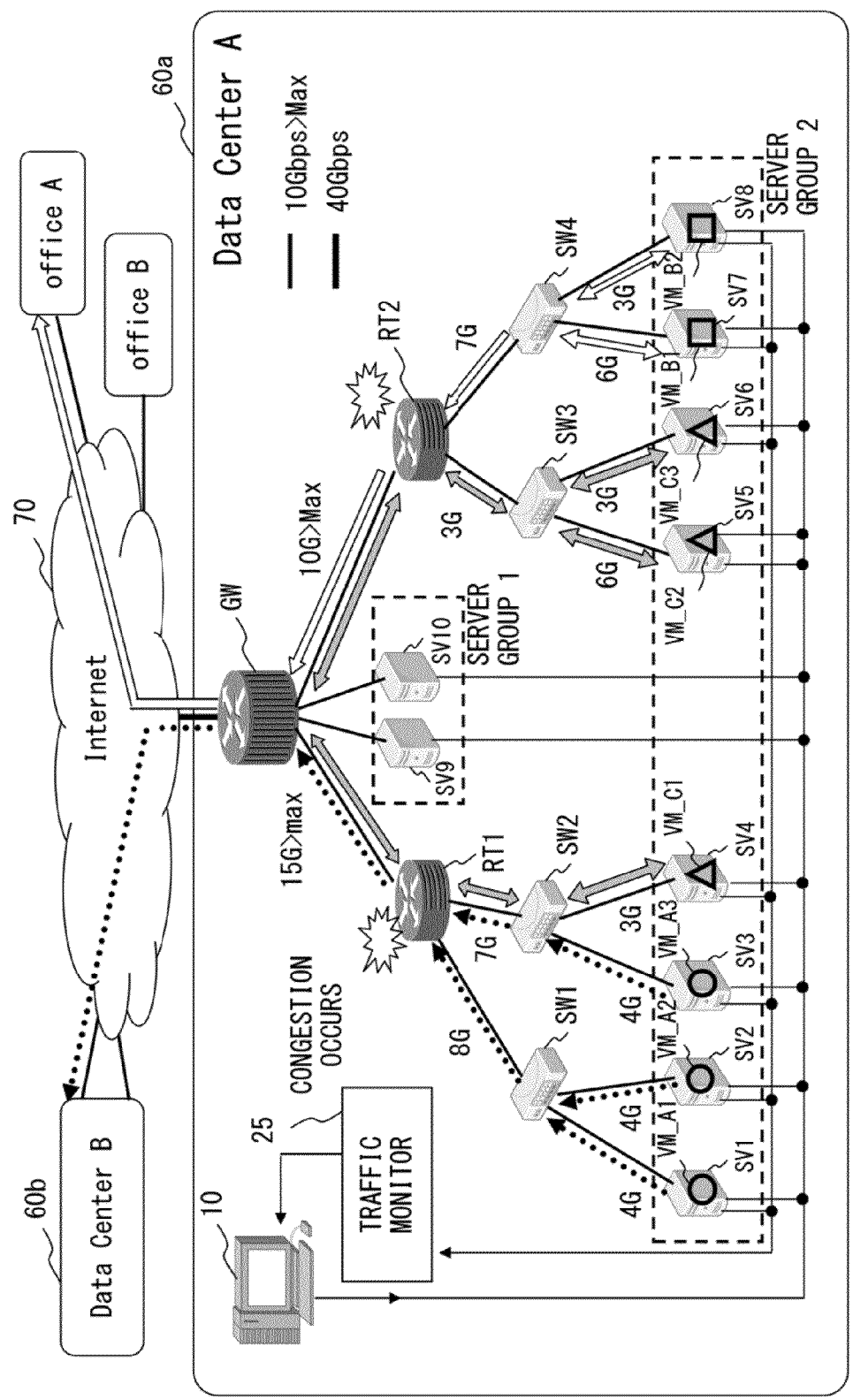
FIG. 5 is a diagram illustrating an example of the arrangement of virtual machines.

FIG. 5 illustrates an example of the arrangement of the virtual machines 34. Hereinafter, the process performed when congestion occurs due to the arrangement of the virtual machine 34 as in FIG. 5 is explained. In FIG. 5, it is assumed that the virtual machines 34 of tenants A-C operate in the data center 60a. Hereinafter, in order to make the relationship between the individual virtual machine 34 and tenant easier to understand, the numeral for the virtual machine 34 is a character string in which an alphabet identifying the tenant and a number identifying the virtual machine 34 are attached after "VM_". For example, VM_A1 is the first virtual machine 34 that provides the service of the tenant A. In addition, the server 30 is also supposed to be identified by a character string in which a number is added after "SV", in FIG. 5.

In the network illustrated in FIG. 5, the relay routes RT1, RT2 are connected to the gateway GW. In addition, the switches SW1, SW2 are connected to the relay router RT1. The switches SW3 and SW4 are connected to the relay router RT2. The servers SV1 and SV2 are connected to the switch SW1, the servers SV3 and SV4 are connected to the switch SW2, the servers SV5 and SV6 are connected to the switch SW3, the servers SV7 and SV8 are connected to the switch SW4. In addition, the servers SV9 and the SV10 are connected to the gateway GW with no intervention of the relay route RT and the switch SW.

FIG. 6 is an example of the topology data 14 that the control apparatus 10 has. In the topology data 14 illustrated in FIG. 6, the relay routes RT and the switches SW that intervenes the route to the gateway GW, for the servers SV1-SV10 are recorded. In addition, the number of hops from the gateway GW for each of the servers SV1-SV10 is also recorded. It is supposed that the control apparatus 10 also stores the upper limit value of the traffic of each line, in addition to the topology data 14 illustrated in FIG. 6.

In FIG. 5, VM_A1 is placed in the server SV1, VM_A2 is placed in the server SV2, and VM_A3 is placed in the server SV3. Further, VM_C1 is placed in the server SV4, VM_C2 is placed in the server SV5, VM_C3 is placed in the server SV6, VM_B1 is placed in the server SV7, and VM_B2 is placed in the server SV8. The traffic monitor 25 performs mirroring of data transmitted/received in the servers SV1-SV10 and sorts in association with the transmission source and destination.

For example, the process in a case in which the virtual machines VM_A1-VM_C3 are placed as illustrated in FIG. 5 and the traffic as described below is generated is explained.

Traffic from the VM_A1 to the data center B: 4 Gbps
Traffic from the VM_A2 to the data center B: 4 Gbps
Traffic from the VM_A3 to the data center B: 4 Gbps
Traffic from the VM_B1 to the office A: 5 Gbps
Traffic from the VM_B2 to the office A: 2 Gbps
Traffic of bidirectional communication between the VM_B1 and the VM_B2: 1 Gbps
Traffic of bidirectional communication between the VM_C1 and the VM_C2: 3 Gbps
Traffic of bidirectional communication between the VM_C2 and the VM_C3: 3 Gbps The communication apparatuses provided in the data center B, office A, office B are supposed to be external communication apparatuses outside the data center 60a.

(1) A traffic monitor 25 obtains traffic information such as the one illustrated in FIG. 7. In the example illustrated in FIG. 7, the traffic information includes information about the virtual machine being the transmission source of the data, the physical server in which the virtual machine being the transmission source is placed, the destination of the data, the physical server in which the virtual machine being the destination is placed, and the usage volume of the traffic. The information about the usage volume of the traffic includes, in the example in FIG. 7, traffic of each communication, externally-addressed traffic, internally-addressed traffic, and the total traffic volume. Here, traffic of each communication is supposed to refer to the traffic generated in individual communication. For example, since the VM_C2 communicates with both the VM_C1 and the VM_C3, the traffic is obtained for each of the data transmission from the VM_C2 to the VM_C1 and the data transmission from the VM_C2 and the VM_C3. The "externally-addressed traffic" is the total volume of traffic generated in the communication addressed outside the data center 60, which is obtained for each virtual machine. On the other hand, the "internally-addressed traffic" is the total volume of the traffic generated in the communication between the virtual machine and another virtual machine inside the data center 60. The "total traffic volume" is the total traffic volume generated in the communication of the virtual machine, which is obtained for each virtual machine.

In the congestion detecting unit 21 of the control apparatus 10, the traffic that flows in each line is calculated using the topology data 14 illustrated in FIG. 6 and the traffic information illustrated in FIG. 7. The calculation of the traffic is performed using the transmission source and destination of data, the size of traffic of each communication. For example, in the line between the switch SW1 and the relay router RT1, traffic of 4 Gbps flows from the VM_A1 and VM_A2 respectively to the data center B, so its traffic is 8 Gbps. In addition, in the line between the switch SW2 and the relay router RT1, traffic (4 Gbps) flows from the VM_A3 to the data center B and traffic (3 Gbps) flows from the VM_C1 to the VM_C2, so it is 7 Gbps. Meanwhile, in the line between the switch SW3 and the relay router RT2, the traffic (3 Gbps) of bidirectional communication between the VM_C2 and VM_C3 does not flow. Therefore, 3 Gbps of the traffic of data from the VM_C2 to the VM_C1 becomes the total volume of the line between the switch SW3 and the relay router RT2. It is assumed that the congestion detecting unit 21 calculates traffic for other lines in a similar manner, and calculates the value presented next to each line in FIG. 5 as the traffic obtained for each line. The congestion detecting unit 21 compares the calculation result and the bandwidth of each line. Here, the "bandwidth" is the maximum value of the amount of data that may be transmitted per unit time in the line. The congestion detecting unit 21 compares the calculation result of the traffic and the bandwidth, and determines that congestion has occurred when larger traffic than the bandwidth flows.

In the explanation below, it is assumed that the bandwidth of the lines inside the data center 60a is all below 10 Gbps. Therefore, when traffic of 10 Gbps or above flows in any of the lines inside the data center 60a according to the calculation, the congestion detecting unit 21 determines that congestion has occurred. In FIG. 5, for easier viewing, the bandwidth is represented as Max. In the example in FIG. 5, in the line between the gateway and the relay router RT1, traffic of 15 Gbps flows according to the calculation while the bandwidth is below 10 Gbps, it is determined that congestion has occurred. Furthermore, in the line between the gateway and the relay router RT2 as well, traffic of 10 Gbps flows according to the calculation while the bandwidth is below 10 Gbps, and it is determined that congestion has occurred.

The congestion detecting unit 21 notifies the arrangement determination unit 22 of the spot where congestion has occurred. Here, the congestion detecting unit 21 notifies the arrangement determination unit 22 of the relay routers RT1 and RT2 as the spot where the congestion has occurred.

(2) The arrangement determination unit 22 sorts the servers SV included in the data center 60a into groups by the number of hops from the gateway GW, using the topology data 14. When the topology data 14 illustrated in FIG. 6 has been obtained, the arrangement determination unit 22 stores the servers SV9, SV10 as a group because both the number of hops from the gateway GW to SV9 and the number of hops from the gateway GW to SV10 are 1. Further, the arrangement determination unit 22 puts the servers SV1-SV8 whose number of hops from the gateway GW is all three into one group. Hereinafter, it is assumed that the arrangement determination unit 22 has sorted and stored the servers SV9 and SV10 into a "server group 1" and the server SV1-SV8 into a "server group 2".

Next, the arrangement determination unit 22 identifies the virtual machine that is performing communication via the relay router RT or the switch SW in which the congestion has occurred as the candidate for changing its arrangement. Further, when there is any externally-addressed traffic from the virtual machine being the candidate for changing its arrangement, the arrangement determination unit 22 tries to arrange the virtual machine in the server whose number of hops is closer from the gateway GW than the server in which the virtual machine is placed.

For example, it is assumed that the arrangement determination unit 22 starts a process to improve the traffic to the relay router RT1 whose status of congestion is worse between the relay routers RT1 and RT2 in which congestion has occurred. The arrangement determination unit 22 refers to the topology data 14 (FIG. 6) to recognize that the servers communicating via the relay router RT1 is the servers SV1-SV4. Since the traffic being the cause of the congestion is transmitted from the servers SV1-SV4, the arrangement determination unit 22 recognizes that the congestion has occurred in the traffic from the servers SV sorted into the server group 2. In the state illustrated in FIG. 5, since no virtual machine is placed in the servers (SV9, SV10) of the server group 1 yet, there are some resources left. Then, the arrangement determination unit 22 determines that the virtual machine whose externally-addressed traffic is large among the virtual machines placed in the servers SV1-SV4 is to be moved to the server SV in the sever group 1.

The arrangement determination unit 22 identifies the virtual machines placed in the server SV being the transmission source of the traffic being the cause of the congestion are the VM_A1, VM_A2, VM_A3 and VM_C1. At this time, the traffic related to the virtual machines identified as the cause of the congestion becomes the information enclosed by a thick line among the traffic information in FIG. 7. The arrangement determination unit 22 identifies the virtual machine whose externally-addressed traffic is large among the virtual machines being the cause of the congestion. Here, the externally-addressed traffic of the VM_A1, VM_A2, VM_A3 is all 4 Gbps, and no externally-addressed traffic is generated in the VM_C1. Therefore, the arrangement determination unit 22 moves one of the VM_A1, VM_A2, VM_A1, VM_A2, VM_A3, to the server in the sever group 1. Here, it is assumed that the arrangement determination unit 22 moves the VM_A3 from the server SV3 to the server SV9.

When moving the virtual machine, the arrangement determination unit 22 generates a control message. The format of the control message is any format that includes an identifier of the virtual machine to be moved and an identifier of the server SV being the destination of the movement. The control message is transmitted to the virtual machine that the control apparatus 10 requests to be moved, via the management network 5. The virtual machine that received the control message moves to the server SV identified by the identifier included in the control message. Here, the arrangement determination unit 22 generates a control message for moving the VM_A3 to the server S9. Upon receiving the control message, the VM_A3 moves from the server SV3 to the server SV9 by live migration.

Figure 8:
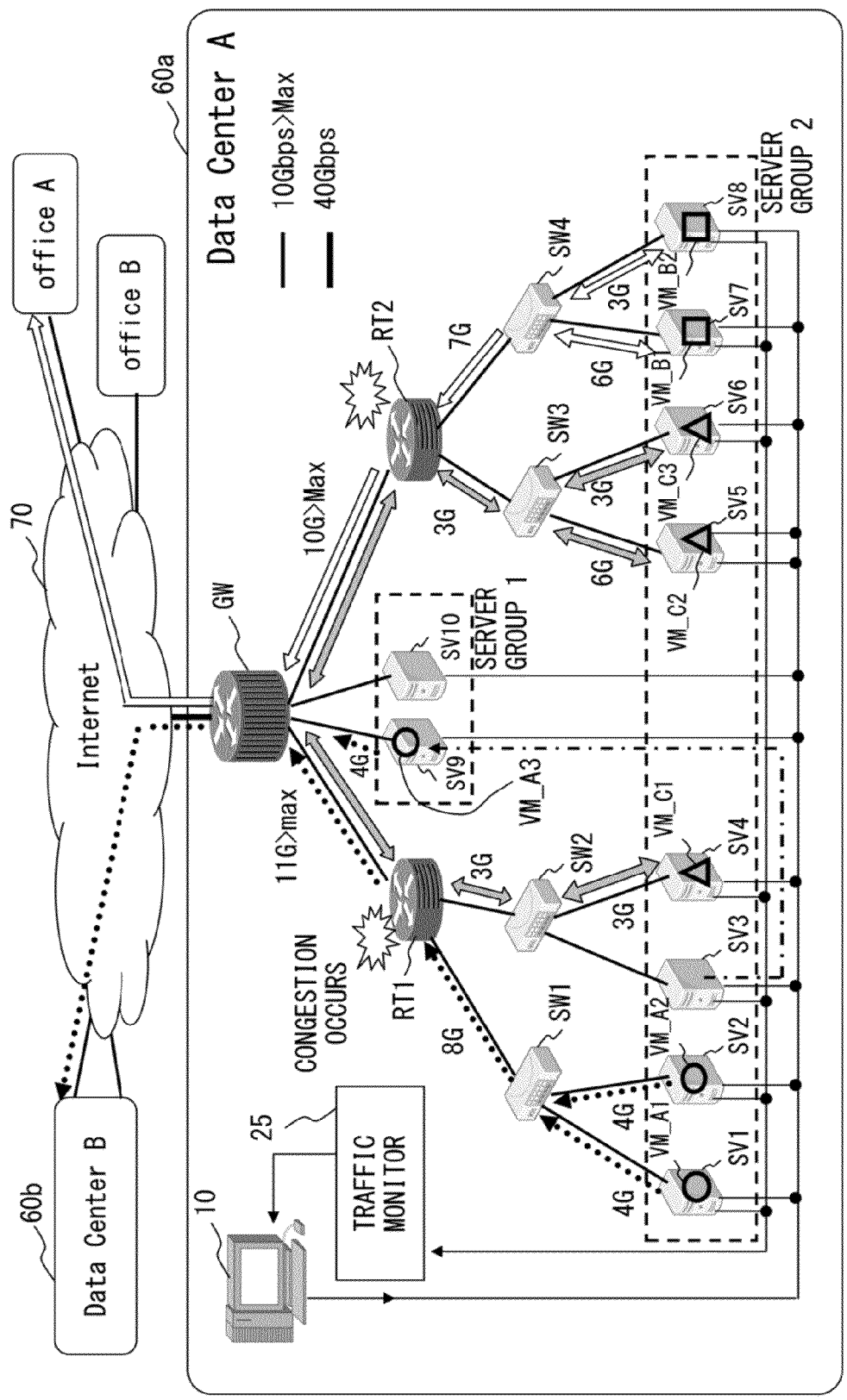
FIG. 8 is a diagram illustrating an example of the arrangement of virtual machines.

(3) An example of the arrangement of the virtual machines when the VM_A3 is moved from the server SV3 to the server SV9 is illustrated in FIG. 8. FIG. 9 illustrates an example of the traffic information that the traffic monitor 25 obtains after the VM_A3 moves from the server SV3 to the server SV9.

When the VM_A3 moves from the server SV3 to the server SV9 as illustrated in FIG. 8 and FIG. 9, the traffic (4 Gbps) addressed to the data center B transmitted from the VM_A3 no longer goes through the switch SW2 and the relay router RT1. Therefore, the traffic from the switch SW2 to the relay router RT1 decreases to 3 Gbps. Furthermore, since the traffic from the relay router RT1 to the gateway GW also decreases to 11 Gbps, while the congestion state in the relay router RT1 is not resolved, the traffic that goes through the relay router RT1 decreases.

(4) Next, the arrangement determination unit 22 performs a process to resolve the congestion in the relay router RT2. The arrangement determination unit 22 refers to the topology data 14 (FIG. 6), and recognizes that the servers communicating via the relay route RT2 are the servers SV5-SV8. In the state illustrated in FIG. 8, the resource of the server SV10 is left in the server group 1, so the virtual machine may be placed in the server SV10. Therefore, the arrangement determination unit 22 determines that the virtual machine whose externally-addressed traffic is large among the virtual machines placed in the server SV5-SV8 is to be moved to the server SV10.

The VM_C2, VM_C3, VM_B1, VM_B2 are placed in the servers SV5-SV8. Therefore, the traffic related to the virtual machines placed in the servers SV5-SV8 is the information enclosed by a thick line among the traffic information in FIG. 9. The arrangement determination unit 22 identifies the virtual machine whose externally-addressed traffic is large, among the virtual machines placed in the serves SV5-SV8. Here, the externally-addressed traffic of the VM_B1 is 5 Gbps, that of the VM_B2 is 2 Gbps, and no externally-addressed traffic has been generated in the VM_C2 and VM_C3. Therefore, the arrangement determination unit 22 moves the VM_B1 to the server SV1. The arrangement determination unit 22 generates a control message for moving the VM_B1 to the server SV10. The VM_B1 moves to the server SV10 according to the control message.

Figure 10:
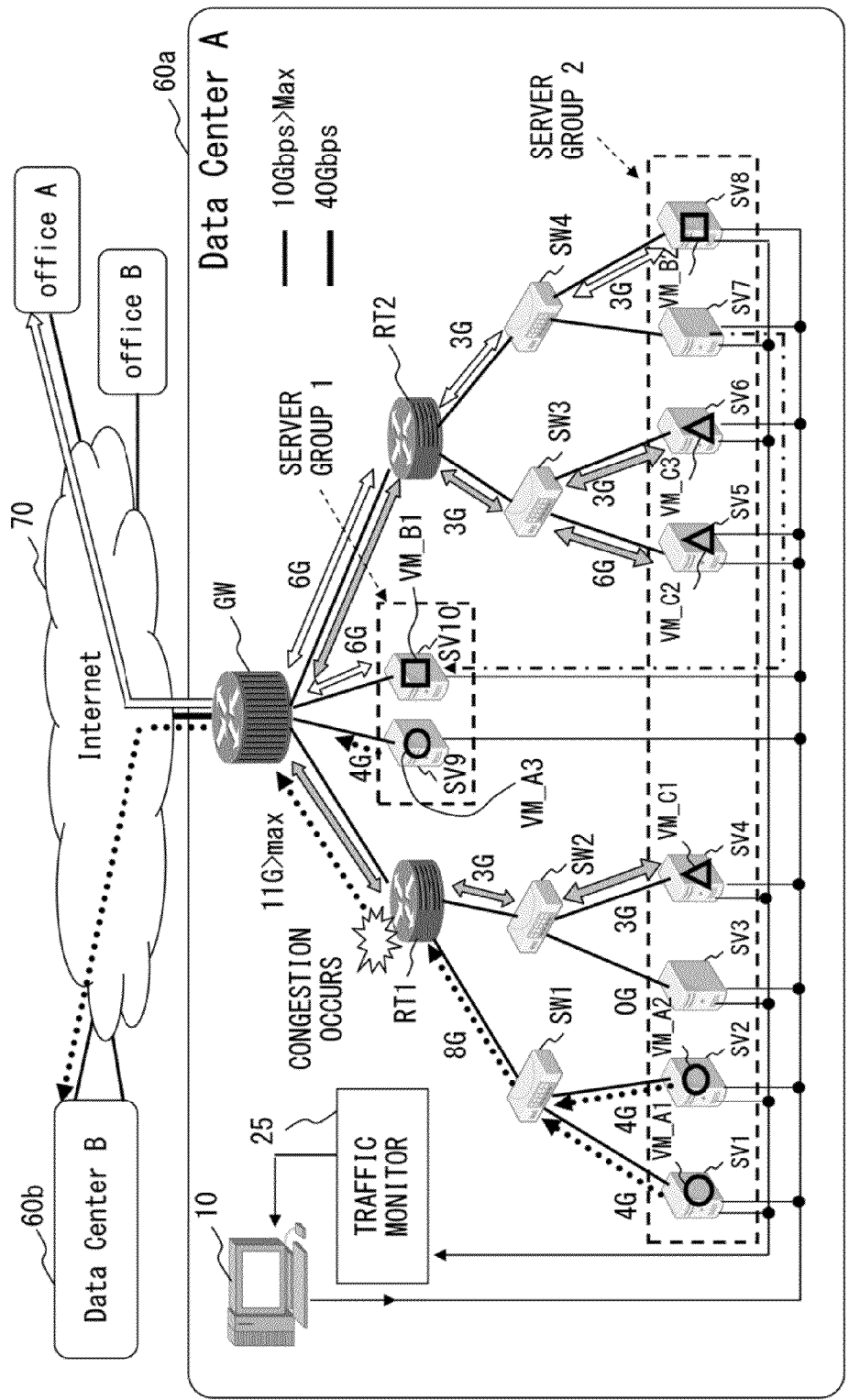
FIG. 10 is a diagram illustrating the arrangement of virtual machines.

An example of the arrangement of the virtual machines when the VM_B1 is moved from the server SV7 to the server SV10 is illustrated in FIG. 10. FIG. 11 illustrates the traffic information that the traffic monitor 25 obtains after the VM_B1 moves from the server SV7 to the server SV10.

When VM_B1 moves from the server SV7 to the server SV10 as illustrated in FIG. 10 and FIG. 11, the traffic addressed to the office A transmitted from the VM_B1 no longer goes through the relay router RT2. Therefore, the traffic from the relay router RT2 to the gateway GW decreases to 6 Gbps, and the congestion state in the relay router RT2 is resolved.

(6) Since the congestion in the relay router RT2 has been resolved but the congestion in the relay router RT1 has not been resolved yet, the arrangement determination unit 22 further changes the arrangement of the virtual machines. By the process in the procedure (5), the virtual machine is placed in all the servers sorted into the server group 1, and no resource is left in the server group 1. Therefore, no virtual machine may be added to the servers in the server group 1. Therefore, the arrangement determination unit 22 checks if there is any virtual machine whose externally-addressed traffic is larger than that of the virtual machines placed in the servers of the server group 1. Here, the externally-addressed traffic of all the virtual machines placed in the servers SV1-SV4 is not larger than the externally-addressed traffic of the virtual machines placed in the servers (SV9, SV10) of the server group 1.

(7) Therefore, the arrangement determination unit 22 focuses on the internally-addressed traffic to move the virtual machine. At this time, the arrangement determination unit 22 tries to use the lines in the data center 60a efficiently, by determining the arrangement so that the number of hops between two virtual machines communicating inside the data center 60a becomes as small as possible.

First, the arrangement determination unit 22 tries to arrange the virtual machines so that the internally-addressed traffic is transmitted/received between the servers connected to the same switch SW, as much as possible. The arrangement determination unit 22 identifies the virtual machine whose internally-addressed traffic is large among the virtual machines communicating via the relay apparatus in which congestion has occurred. Further, whether or not the identified virtual machine may be moved to the server SV connected to the same switch SW as the virtual machine being the transmission destination of the data is checked. Meanwhile, it is assumed that the arrangement determination unit 22 refers to the topology data 14 as needed, to check the connection relationship of the servers SV.

In the example illustrated in FIG. 10, FIG. 11, the VM_C1 transmits data addressed to the VM_C2. Then, the arrangement determination unit 22 considers moving of the VM_C1. The VM_C2 being the destination of the data transmitted from the VM_C1 is placed in the server SV5. The server SV5 is connected to the switch SW3. While the server SV6 is connected to the switch SW3 other than the server SV5, the VM_C3 has been already placed in the server SV6. Therefore, the arrangement determination unit 22 determines that it is impossible to move the VM_C1 to the server SV6.

(8) When it is impossible to arrange the virtual machines so that the internally-addressed traffic is transmitted/received between the servers connected to the same switch, the arrangement determination unit 22 tries to arrange the virtual machines so that the internally-addressed traffic is transmitted/received between servers connected to the same relay router RT. At this time, the arrangement determination unit 22 refers to the topology data 14 as needed as well.

In the example illustrated in FIG. 10, FIG. 11, the VM_C2 is connected to the relay router RT2 via the switch SW3. To the relay router RT2, the switch SW4 is connected other than the switch SW3, and the servers SV7 and SV8 are connected to the switch SW4. While the VM_B2 has already been placed in the SV8, no virtual machine is placed in the server SV7. Therefore, the arrangement determination unit 22 moves the VM_C1 from the server SV4 to the server SV7. The thick line in FIG. 11 indicates the traffic of the server SV4 and the server SV7.

Figure 12:
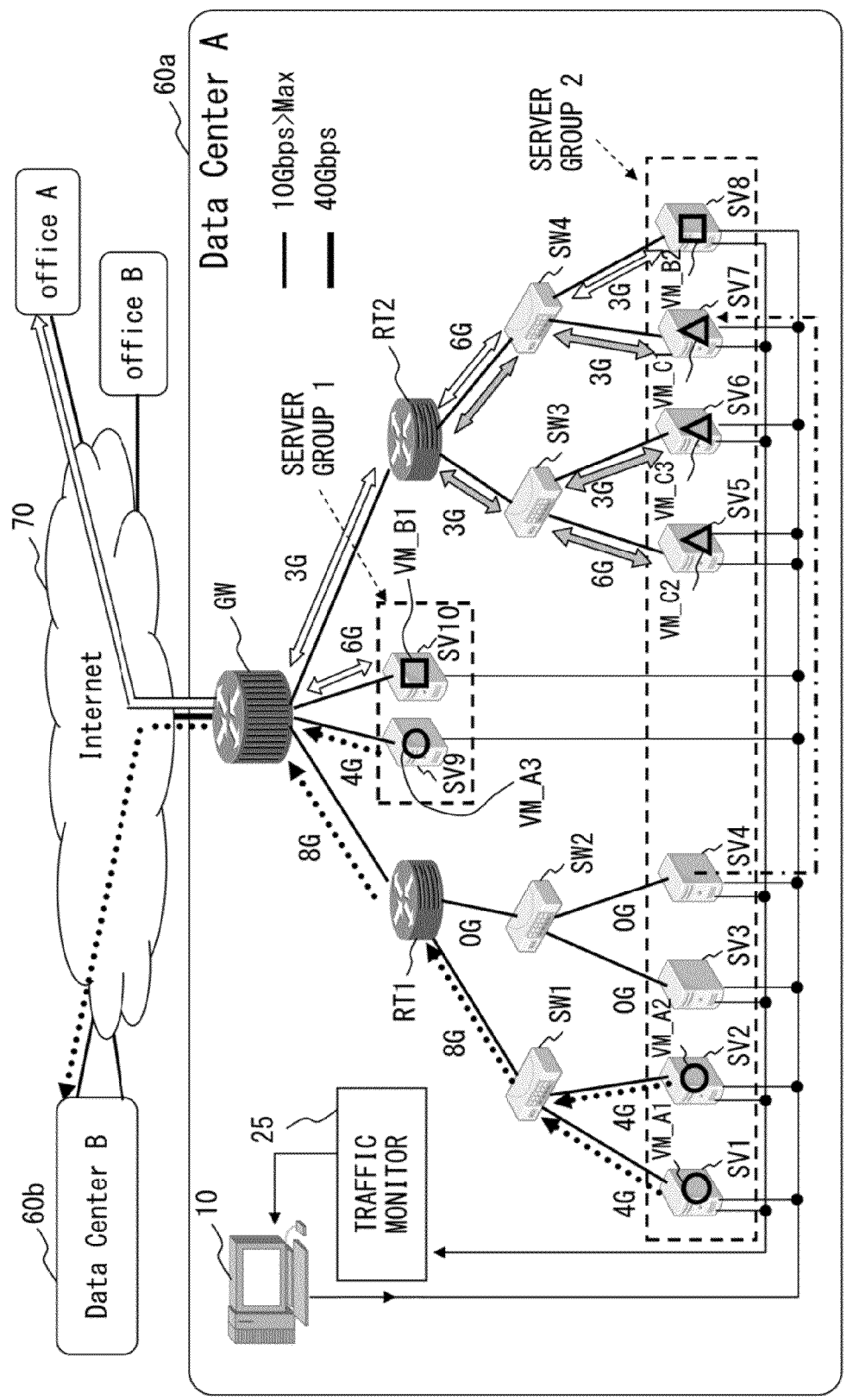
FIG. 12 is a diagram illustrating the arrangement of virtual machines.

The example of the arrangement of the virtual machine when the VM_C1 moves from the server SV4 to the server SV7 is illustrated in FIG. 12. FIG. 13 illustrates an example of the traffic information that the traffic monitor 25 obtains after the VM_C1 moves from the server SV4 to the server SV7.

When the VM_C1 moves from the server SV4 to the server SV7 as illustrated in FIG. 12 and FIG. 13, the traffic addressed to the VM_C2 transmitted from the VM_C1 no longer goes through the relay router RT1. Therefore, the traffic from the relay router RT1 to the gateway GW decreases to 8 Gbps, and the congestion state in the relay router RT1 is resolved. Therefore, by the processes described in the procedures (1)-(9), the congestion state illustrated in FIG. 5 is resolved.

Figure 14:
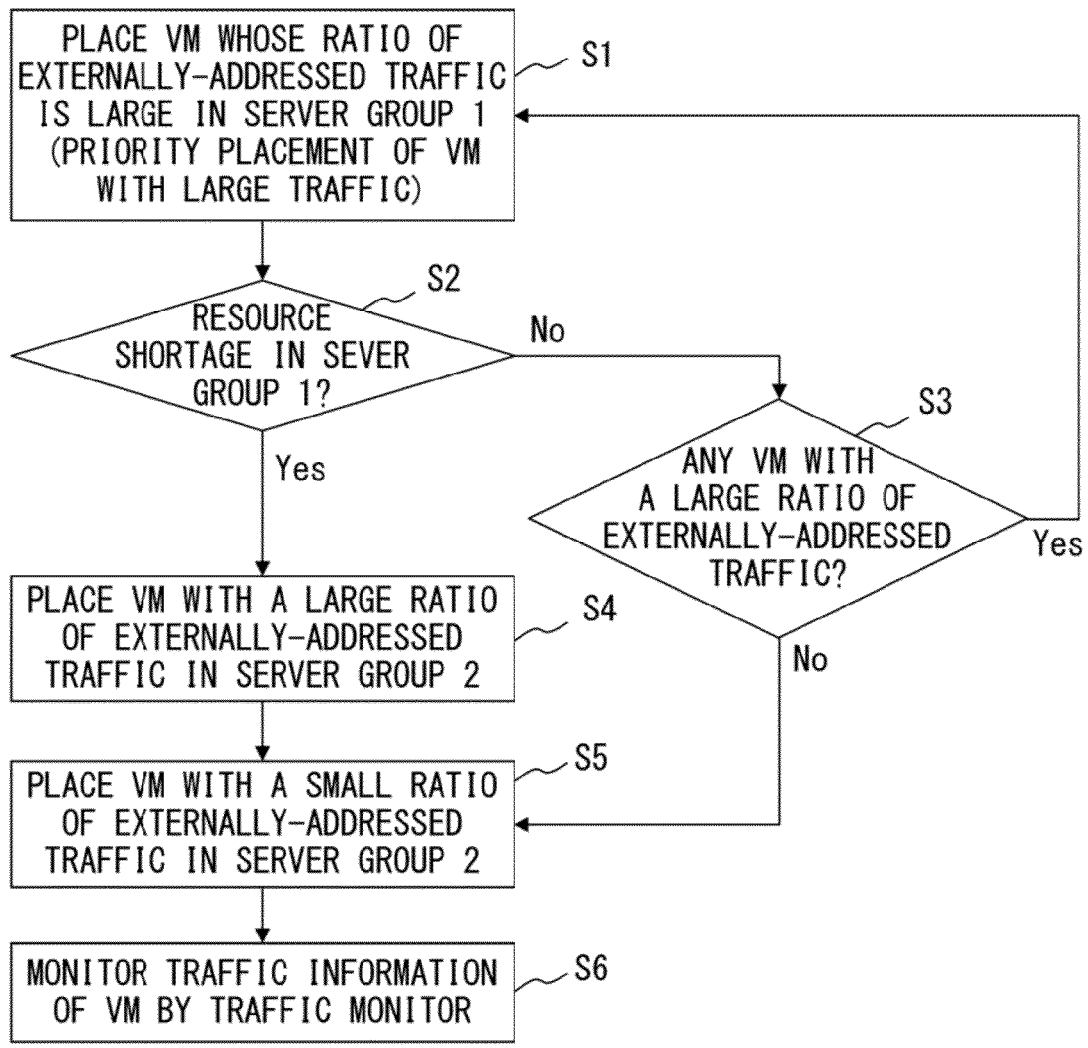
FIG. 14 is a flowchart illustrating an example of a process performed in a case in which the arrangement of virtual machines is determined before operating the virtual machines.

While the change of the arrangement after the operation of the virtual machines starts and the arrangement illustrated in FIG. 5 is made in the example above, the arrangement determination unit 22 may determine the arrangement of the virtual machines also before the operation of the virtual machines start. FIG. 14 is a flowchart illustrating an example of a process in a case in which the arrangement of the virtual machines is determined prior to the operation of the virtual machine. It is assumed that before the operation illustrated in FIG. 14 starts, the arrangement determination unit 22 has identified the amount of the externally-addressed traffic and the internally-addressed traffic for each virtual machine. In addition, here, it is assumed that the arrangement determination unit 22 has sorted the servers SV into the server group 1 and the server group 2 based on the number of hops from the gateway GW as well. It is assumed that the servers in the server group 1 has a smaller number of hops from the gateway GW compared with the servers in the server group 2.

In the process in FIG. 14, for each virtual machine, whether the ratio of the externally-addressed traffic with respect to the total amount of traffic of the virtual machine is large is judged, and the process proceeds according to the judgment result. Here, the judgment as to whether the ratio of the externally-addressed traffic is large or not is determined relatively by the comparison between the virtual machines placed in the same data center 60. Therefore, a threshold is determined as needed according to the ratio of the externally-addressed traffic of the virtual machines placed in the same data center 60, and whether the ratio of the externally-addressed traffic of the individual virtual machine is large or not is determined according to the threshold. For example, when the threshold is 70%, in the virtual machine whose externally-addressed traffic is 65% of the total amount of traffic, the ratio of the externally-addressed traffic is judged as small. The virtual machine whose externally-addressed traffic has not been judged as large is supposed to be treated as a virtual machine whose ratio of internally-addressed traffic is large.

The arrangement determination unit 22 arranged the virtual machine (VM) whose ratio of externally-addressed traffic is large in the server group 1 (step S1). At this time, the arrangement determination unit 22 is supposed to place the virtual machine which has larger externally-addressed traffic in the server of the server group 1 with priority. The arrangement determination unit 22 checks whether there is a shortage in the resource in the servers which belong to the server group 1 (step S2). When there is no shortage in the resource in the servers which belong to the server group 1, whether there is any virtual machine whose ratio of the externally-addressed traffic is large among the virtual machines whose arrangement has not been determined yet (No in step S2, step S3). When a virtual machine whose ratio of externally-addressed traffic is large is included in the virtual machines whose arrangement is not determined, the arrangement determination unit 22 returns to the process in step S1 (Yes in step S3).

When there is a shortage in the resource of the servers in the server group 1, the arrangement determination unit 22 places the virtual machine whose ratio of externally-addressed traffic is large among the virtual machines whose arrangement has not been determined yet in the server of the server group 2 (Yes in step S2, step S4). When the arrangement of the virtual machine whose ratio of externally-addressed traffic is large is done, the arrangement determination unit 22 places the virtual machine whose ratio of internally-addressed traffic is large in the server of the server group 2 (step S5). In addition, when it is determined that the arrangement of the virtual machines having externally-addressed traffic is done in step S3, the process in step S5 is performed as well. When the arrangement of the virtual machines whose ratio of internally-addressed traffic is large is done, the monitoring of the traffic information is started by the traffic monitor 25 (step S6).

Figure 15B:
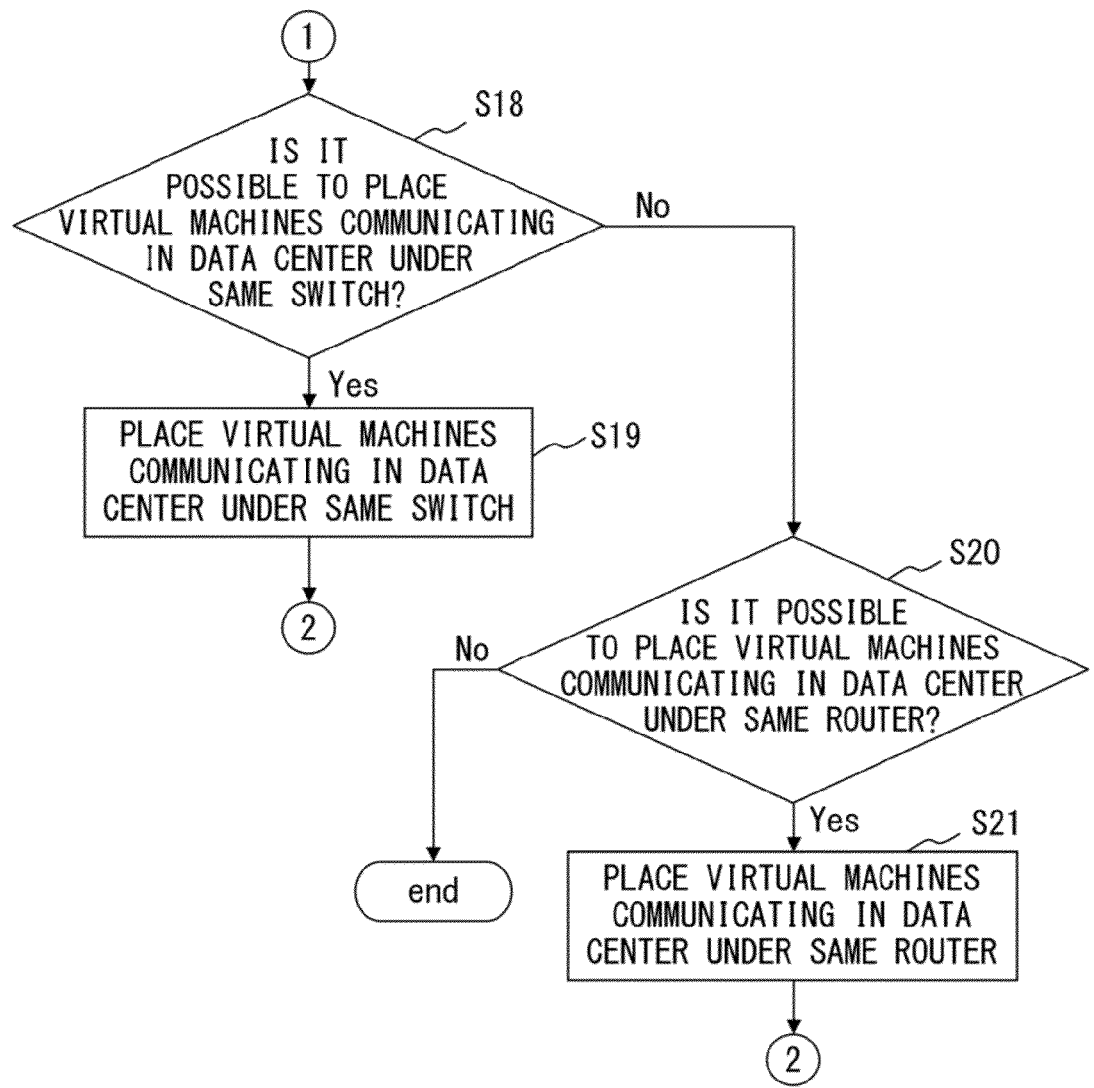
FIG. 15B is a flowchart illustrating an example of a process when a congestion occurs.

FIG. 15A and FIG. 15B are flowcharts illustrating an example of a process when congestion occurs. The congestion detection unit 21 detects the occurrence of congestion using the topology data 14 and traffic information obtained from the traffic monitor 25 (step S11). The process in step S11 is repeated until congestion occurs. When the congestion detection unit 21 detects an occurrence of congestion, the congestion detection unit 21 notifies the arrangement determination unit 22 of the spot where the congestion has occurred. The arrangement determination unit 22 identifies the virtual machine being the transmission source of the traffic being the cause of the congestion, based on the information sent from the congestion detecting unit 21 and the topology data 14 (step S12). Next, the arrangement determination unit 22 checks whether any resource left in the server whose number of hops to the gateway GW is smaller than that of the server in which the virtual machine being the cause of the congestion is placed (step S13). When there is any resource left in the server whose number of hops to the gateway GW is smaller, the arrangement determination unit 22 checks whether any virtual machine having externally-addressed traffic is included in the cause of the congestion (Yes in step S13, step S14). When any virtual machine having externally-addressed traffic is included in the cause of the congestion, the arrangement determination unit 22 moves the virtual machine being the cause of the congestion and whose externally-addressed traffic is largest to the server whose number of hops to the gateway GW is small (Yes in step S14, S15).

On the other hand, when any virtual machine having externally-addressed traffic is not included in the cause of the congestion, the arrangement determination unit 22 makes the communication in the data center more efficient (No in step S14). The arrangement determination unit 22 judges whether it is possible to place the virtual machine being the cause of the congestion in the server connected to the same switch SW as the server in which the virtual machine being the communication destination is placed (step S18). If it is judged as possible in step S18, the arrangement determination unit 22 places the virtual machine being the cause of the congestion to the server connected to the same switch as the server in which the virtual machine being the communication destination is placed (step S19). When the judgment result in step S18 is No, the arrangement determination unit 22 judges whether it is possible to place the virtual machine being the cause of the congestion in the server connected to the same relay router RT as the server in which the virtual machine being the communication destination is placed (step S20). If it is determined that the placement is possible in step S20, the arrangement determination unit 22 places the virtual machine being the cause of the congestion in the server connected to the same router RT as the server in which the virtual machine being the communication destination is placed (step S21). After the process in step S19 or step S21 is performed, the processes in and after step 11 are repeated.

Next, in step S13, a process in a case in which a judgment is made that there is no resource left in the server whose number of hop to the gateway GW is smaller than that of the server in which the virtual machine being the cause of the congestion is placed (No in step S13) is described. In this case, the arrangement determination unit 22 compares the size of externally-addressed traffic of the virtual machine being the cause of the congestion with the size of externally-addressed traffic of the virtual machine placed in the server whose number of hops to the gateway GW is smaller (step S16). When the externally-addressed traffic in the virtual machine being the cause of the congestion is larger, the arrangement determination unit 22 places the virtual machine whose externally-addressed traffic is larger to the server SV whose number of hops from the gateway GW is smaller (Yes in step S16, step S17). At this time, the virtual server that has been placed in the server SV with smaller number of hops from the gateway GW is moved to another server having some resource left. On the other hand, when the externally-addressed traffic in the virtual machine being the cause of the congestion is smaller (No in step S16), as explained with reference to steps S18-S21, the process to make the communication inside the data center 60 more efficient is performed.

As described above, in the present embodiment, the virtual machine whose traffic addressed outside the data center 60 is larger is placed in the server whose number of hops from the gateway GW is smaller. Therefore, the route of the traffic addressed outside in the data center 60 may be shortened, and the lines inside the data center 60 may be used efficiently.

Further, the arrangement determination unit 22 determines the arrangement of the virtual machines so that the number of hops between the virtual machines that transmit/receive to/from each other becomes as small as possible. First, the arrangement determination unit 22 tries to place the virtual machines that transmit/receive data to/from each other in the servers connected to the same switch SW as much as possible. If it is impossible to place the virtual machines that transmit/receive data to/from each other in the servers connected to the same switch SW, the arrangement determination unit 22 places the virtual machines that transmit/receive data to/from each other in the servers connected to the same relay router RT as much as possible. By these processes, the communication inside the data center 60 also becomes more efficient.

In the present embodiment, since the congestion is avoided by making the communication more efficient, deterioration of the communication quality due to congestion is also avoided. While the explanation has been made with an example of the case in which one unit of the virtual machine is placed in one unit of the server in the example above to facilitate understanding, the number of the virtual machines placed in one unit of the server is arbitrary. Therefore, the virtual machines that transmit/receive data to/from each other may be placed in the same server.

<Second Embodiment>

In the second embodiment, the operation of the control apparatus 10 about a case in which the total number of virtual machine to be placed varies is explained in detail.

Figure 16:
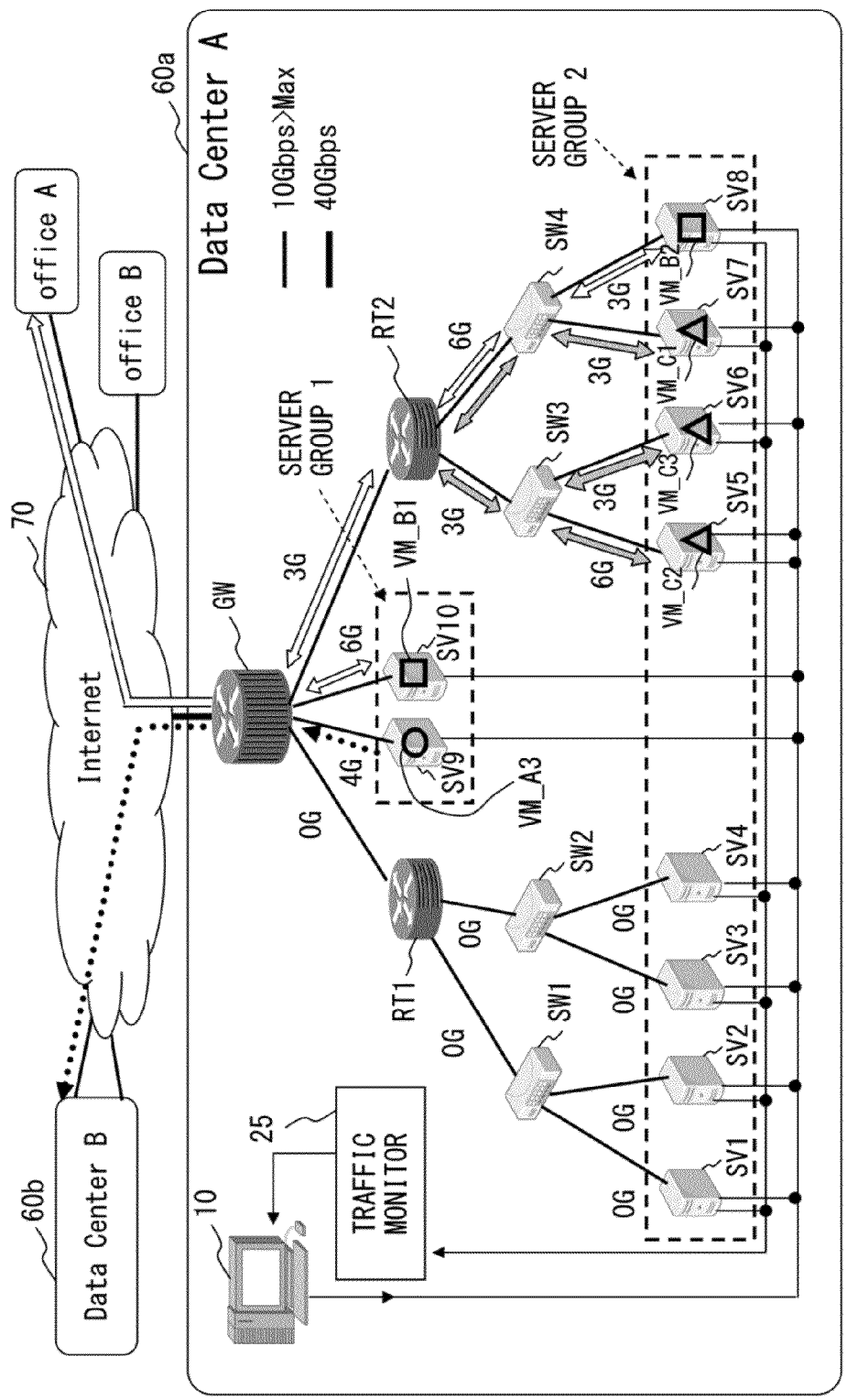
FIG. 16 is a diagram illustrating an example of the arrangement of virtual machines when a virtual machine is eliminated.

For example, it is assumed that the amount of process performed in the tenant A decreases after the congestion is resolved by the placement of the virtual machines as illustrated in FIG. 12. In the tenant A, it is assumed that the VM_A1 and the VM_A2 are stopped according to the decrease in the process. An example of the arrangement of the virtual machines and the traffic in each line when the VM_A1 and the VM_A2 are stopped are illustrated in FIG. 16. In FIG. 16, no virtual machine is placed in the servers (SV1-SV4) connected to the relay router RT1. The arrangement of the server of the other servers SV5-SV10 and the traffic generated by the virtual machine placed in those servers are similar to those in FIG. 12.

After that, it is assumed that the tenant D starts the process in the data center 60a. The tenant D is assumed to operate the VM_D1 and the VM_D2. Here, it is assumed that the VM_D1 is placed in the server SV1, and the VM_D2 is placed in the server SV2.

Next, the process in a case in which the traffic as described below is generated is explained. The arrangement of the virtual machine and the traffic at this time are illustrated in FIG. 17.

Traffic from the VM_A3 to the data center B: 4 Gbps
Traffic from the VM_B1 to the office A: 5 Gbps
Traffic from the VM_B2 to the office A: 2 Gbps
Traffic of bidirectional communication between the VM_B1 and the VM_B2: 1 Gbps
Traffic of bidirectional communication between the VM_C1 and the VM_C2: 3 Gbps
Traffic of bidirectional communication between the VM_C2 and the VM_C3: 3 Gbps
Traffic from the VM_D1 to the data center B: 5 Gbps
Traffic from the VM_D2 to the data center B: 5 Gbps

Figure 17:
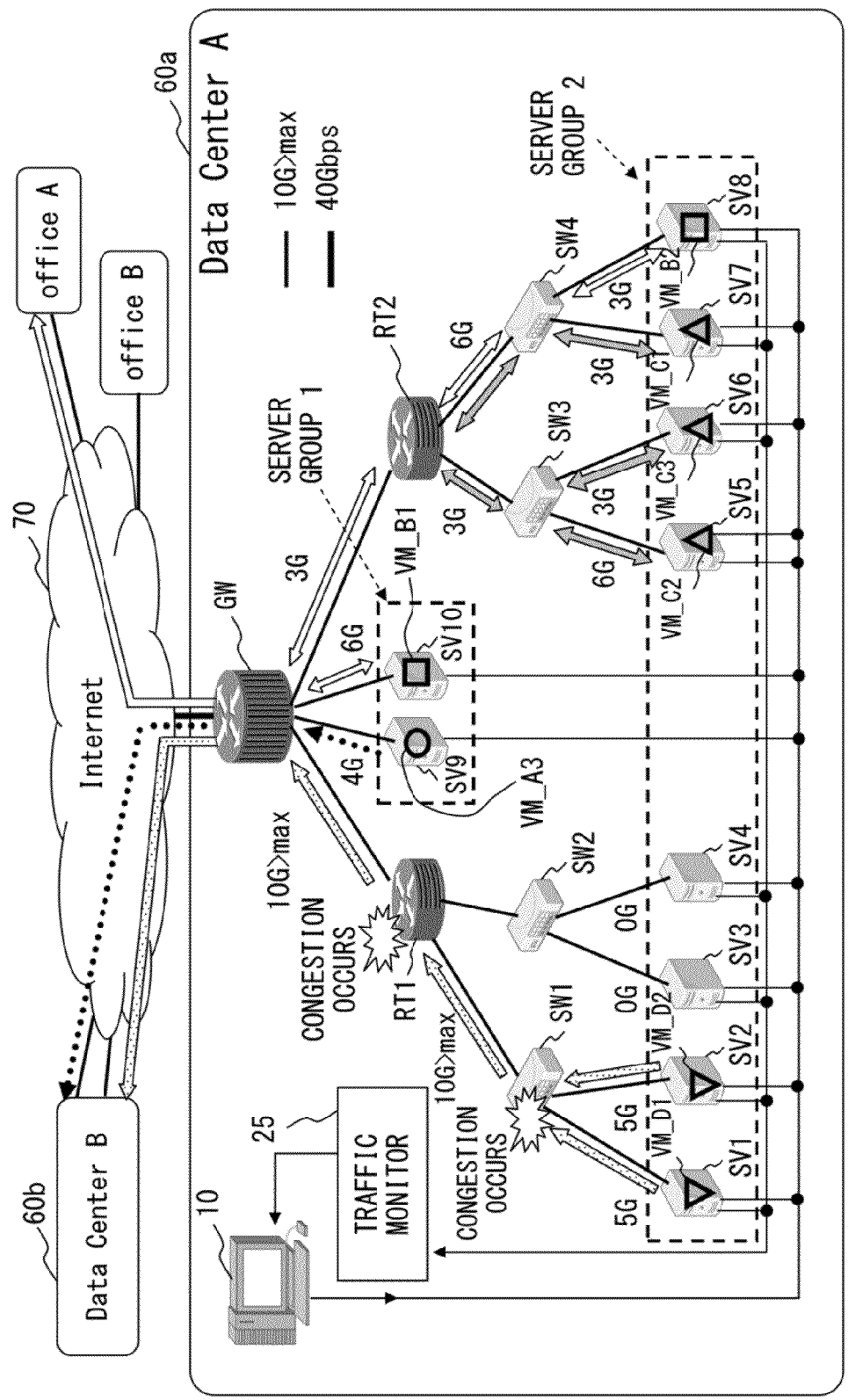
FIG. 17 is a diagram illustrating an example of the arrangement of virtual machines when a virtual machine is added.

(11) When the traffic described above is generated in the state in which the virtual machines are arranged as illustrated in FIG. 17, the traffic monitor 25 obtains the traffic information such as that illustrated in FIG. 18 for example. The congestion detecting unit 21 calculates the traffic obtained in each line using the topology data 14 illustrated in FIG. 6 and the traffic information illustrated in FIG. 18. Further, using the calculating result, the occurrence of congestion is detected. The calculation of traffic and the detecting method of congestion is similar to those in the first embodiment. Next the each of line in FIG. 17, the calculated value of the traffic flowing in the line is presented.

In the example in FIG. 17 and FIG. 18, since the traffic of the line between the gateway and the relay router RT1, and the line between the switch SW1 and the relay router RT1 is 10 Gbps while the bandwidth is less than 10 Gbps, judgment is made that congestion has occurred. The congestion detecting unit 21 notifies the arrangement determination unit 22 of the occurrence of the convergence in the relay router RT1 and the switch SW1.

(12) The arrangement determination unit 22 sorts the servers by the number of hops using the topology data 14, in a similar manner as in the first embodiment. Hereinafter, it is assumed that the servers SV9 and the SV10 are sorted and stored as the "server group 1", and the servers SV1-SV8 as the "server group 2".

Upon the notification of the occurrence of the convergence in the relay router RT1 and the switch SW1, the arrangement determination unit 22 refers to the topology data 14 (FIG. 6), to identify the virtual machine to be the candidate to change its arrangement. Here, the VM_D1 and the VM_D2 are selected as the candidate to change its arrangement.

(13) The arrangement determination unit 22 identifies the server SV in which the virtual machine may be placed using the topology data 14. In the example in FIG. 17 and FIG. 18, it is impossible to place any new virtual machine in the servers in the server group 1. The arrangement determination unit 22 recognizes that the virtual machine may be placed in the servers SV3 and SV4. However, since the servers SV3 and SV4 are both connected to the relay router RT1, even if either the VM_D1 or the VM_D2 is moved to the server SV3 or SV4, the congestion in the relay router RT1 is not resolved.

(14) Next, the arrangement determination unit 22 compares the size of the externally-addressed traffic of the virtual machine being the cause of the congestion with the size of the externally-addressed traffic of the virtual machine placed in the server whose number of hops to the gateway GW is smaller. Both the VM_D1 and VM_D2 are placed in the server SV whose number of hops from the gateway GW is 3. In the servers SV9 and SV10 whose number of hops from the gateway GW is 1, the VM_A3 and VM_B1 are placed. Here, the traffic addressed externally at the VM_A3 is 4 Gbps, which is smaller than the externally-addressed traffic of both the VM_D1 and VM_D2. The traffic of the VM_A3, the VM_D1 and VM_D2 is as indicated by a thick line in FIG. 18.

The arrangement determination unit 22 determines that one of the VM_D1 and VM_D2 is to be placed in the server 9 instead of the VM_A3. Here, it is assumed that the arrangement determination unit 22 determines that the VM_D2 is to be placed in the server SV9.

(15) The arrangement determination unit 22 requests, to the VM_D2, live migration from the server SV2 to the server SV9. In addition, to the VM_A3, live migration from the server SV9 to the server SV2 is requested. The process performed by the control apparatus 10 upon request of live migration is similar to that in the first embodiment.

Figure 19:
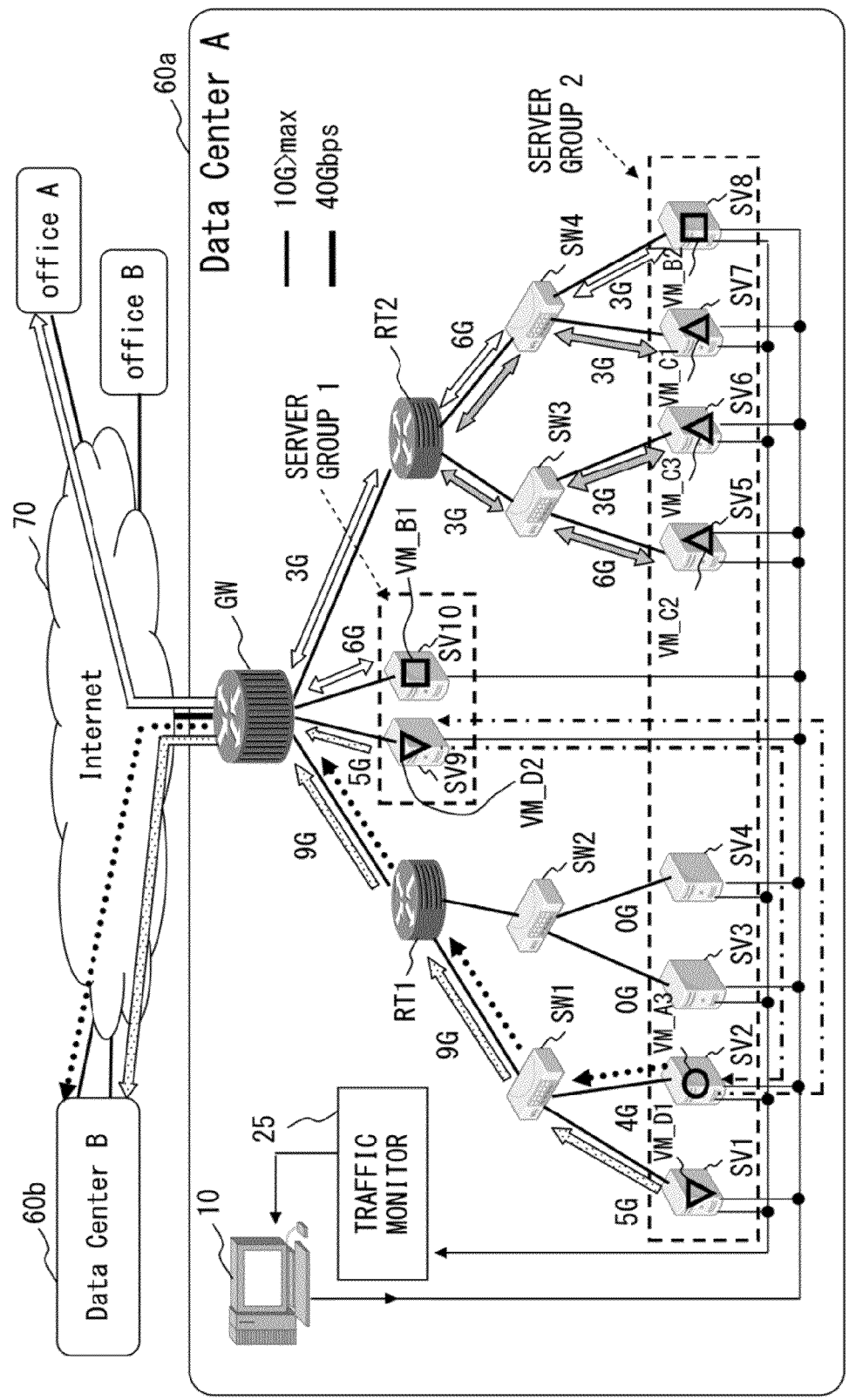
FIG. 19 is a diagram illustrating the arrangement of virtual machines.

(16) An example of the arrangement of the virtual machines when the VM_D2 moves from the server SV2 to the server SV9 and the VM_A3 also moves from the server SV9 to the server SV2 is illustrated in FIG. 19. FIG. 20 illustrates an example of the traffic information that the traffic monitor 25 obtains after the VM_D2 and the VM_A3 have moved.

When the VM_A3 and the VM_D2 move as illustrated in FIG. 19 and FIG. 20, the traffic addressed to the data center B transmitted from the VM_D2 no longer goes through the relay router RT1. Instead, the traffic addressed to the data center B transmitted from the VM_A3 goes through the relay router RT1, but the traffic addressed to the data center B from the VM_A3 is smaller than the traffic addressed to the data center B from the VM_D2. Therefore, the traffic from the relay router RT1 to the gateway GW decreases to 9 Gbps, and the congestion state in the relay router RT1 is resolved. Therefore, the congestion state illustrated in FIG. 17 is resolved by the processes in the procedures (11)-(16).

As described above, even in a case in which the number of virtual machines change, congestion is resolved by placing the virtual machine whose traffic addressed outside the data center 60 is large in the server whose number of hops from the gateway GW is small with priority. In addition, while no specific example is presented in the present embodiment even when the number of virtual machines change, the traffic in the data center 60 may also be made more efficient by the processes similar to steps S18-S21 in FIG. 15B.

<Third Embodiment>

In the third embodiment, a case in which the arrangement of the virtual machines is determined using the degree of priority of data to be transmitted/received is explained. In the third embodiment, it is assumed that the traffic monitor 25 checks the degree of priority of data transmitted/received to/from the virtual machines. It is assumed that the traffic monitor 25 may check the degree of priority of data to be transmitted/received, when the communication starts, for example. The traffic monitor 25 may identify the degree of priority using the value of the Type of Service (TOS) field or the Traffic Class field included in the Internet Protocol (IP) header.

FIG. 21 is a table explaining an example of the sorting of the traffic and the arrangement policy. In the in FIG. 21, it is assumed that sorting is performed into two types including the traffic with a high priority and the traffic with a low priority. Here, it is assumed that the traffic with a low priority is traffic generated in best-effort type communication, and the traffic with a high priority is traffic generated by guaranty-type communication. The virtual machines are sorted into four types illustrated in FIG. 21, according to the degree of priority of traffic and which of the ratio of traffic addressed outside and the ratio of traffic addressed inside the data center 60 is higher.

The arrangement determination unit 22 is supposed to determine the arrangement in the order of 1) the virtual machine whose ratio of externally-addressed traffic with a high priority is high 2) the virtual machine whose ratio of internally-addressed traffic with a high priority is high 3) the virtual machine whose ratio of externally-addressed traffic with a low priority is high 4) the virtual machine whose ratio of internally-addressed traffic with a low priority is high.

The virtual machine whose ratio of externally-addressed traffic with a high priority is high is placed in the server SV whose number of hops from the gateway GW is small, as much as possible. The virtual machine whose ratio of internally-addressed traffic with a high priority is high is placed in the server SV whose number of hops from the gateway GW is large. At this time, the arrangement determination unit 22 makes the arrangement so that the virtual machines that transmit/receive data to/from each other are placed in the servers SV connected with the same switch SW, as much as possible. When placement in the servers connected with the same switch SW is impossible, the arrangement determination unit 22 makes the arrangement so that the virtual machines that transmit/receive data to/from each other are placed in the servers SV connected with the same relay router RT, as much as possible.

The virtual machine whose ratio of externally-addressed traffic with a low priority is high is placed after the placement of the virtual machine that transmits/receives traffic with a high priority is done. The arrangement determination unit 22 places the virtual machine whose ratio of externally-addressed traffic with a low priority is high in the server whose number of hops from the gateway GW is small as much as possible, based on the result of monitoring the available resource in the server group. Further, the arrangement determination unit 22 places the virtual machine with a large ratio of internally-addressed traffic with a low priority so that the virtual machines that transmit/receive data are placed in the servers connected to the same switch SW or the relay router RT.

Figure 22:
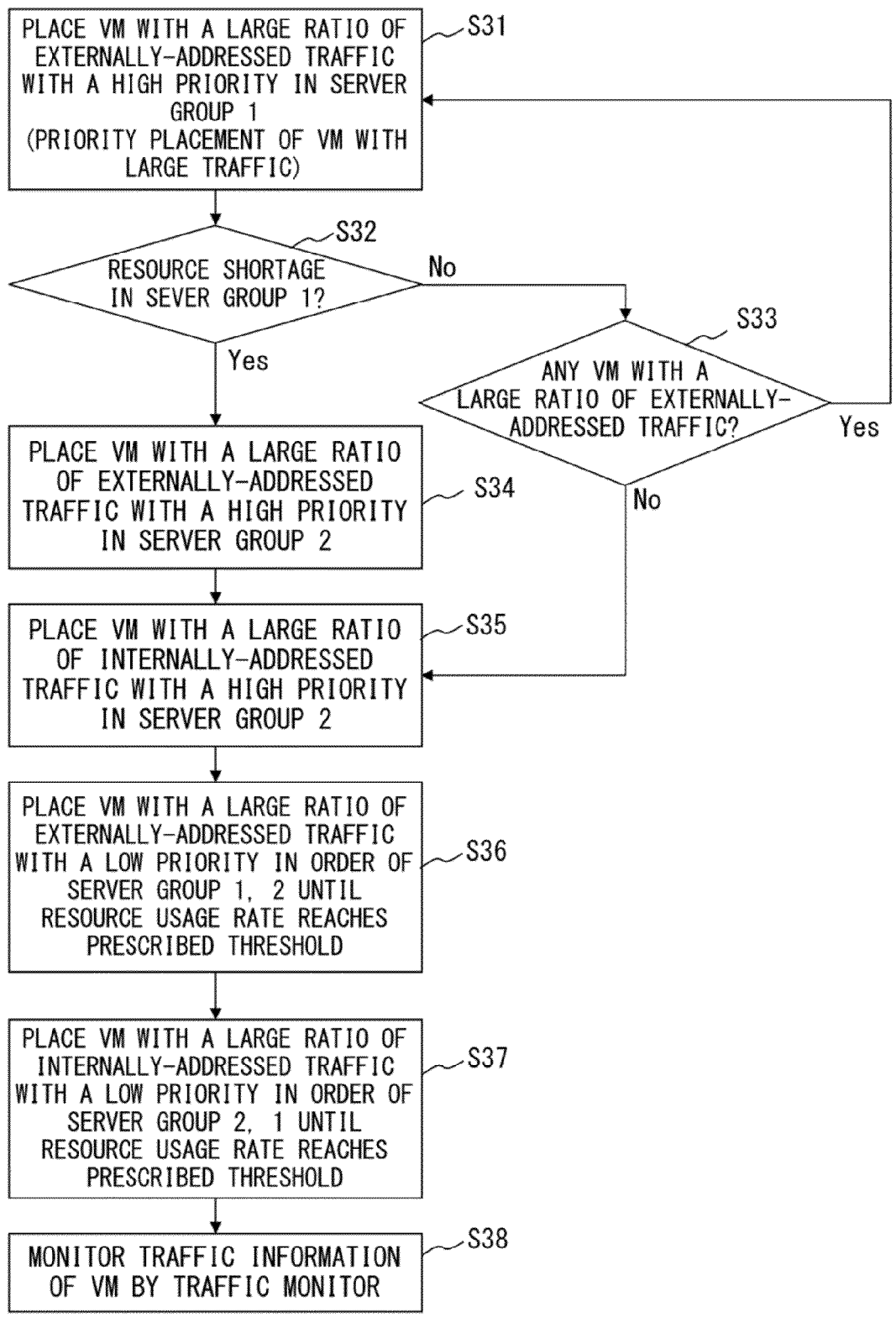
FIG. 22 is a flowchart illustrating an example of a process performed when the arrangement of virtual machines is determined.

FIG. 22 is a flowchart explaining an example of a process when the arrangement of the virtual machines is determined. The arrangement determination unit 22 places the virtual machine (VM) with a large ratio of externally-addressed traffic with a high priority in the server group 1 (step S31). At this time, the arrangement determination unit 22 is supposed to place the virtual machine with large externally-addressed traffic in the server which belongs to the server group 1 with priority. When there is no shortage of resource in the server group 1, the arrangement determination unit 22 checks whether there is any virtual machine whose arrangement has not been determined yet is left in the virtual machines having externally-addressed traffic with a high priority (No in step S32, step S33). When there is any virtual machine whose arrangement has not been determined yet and whose ratio of externally-addressed traffic with a high priority is high left, the arrangement determination unit 22 returns to the process in step S31 (Yes in step S33).

When there is a shortage of resource in the server in the server group 1, the arrangement determination unit 22 places the virtual machine whose ratio of externally-addressed traffic with a high priority is higher among the virtual machines whose arrangement has not been determined yet in the server in the server group 2 (No in step S32, step S34). When the placement of the virtual machines whose ratio of externally-addressed traffic with a high priority is done, the arrangement determination unit 22 places the virtual machine whose ratio of internally-addressed traffic with a high priority is high in the server group 2 (step S35). In addition, when judgment is made in step S33 that the placement of the virtual machines having externally-addressed traffic with a high priority is done, the process in step S35 is performed as well.

Next, if there is any resource left in the server group 1, the arrangement determination unit 22 places the virtual machine whose ratio of externally-addressed traffic with a low priority is large in the server group 1. When there is no resource left in the server group 1 and there is any resource left in the server group 2, the arrangement determination unit 22 places the virtual machine whose ratio of the externally-addressed traffic with a low priority is high in the server group 2 (step S36). If there is no resource left in both the server groups 1, 2, the arrangement determination unit 22 does not place the virtual machine whose ratio of the externally-addressed traffic with a low priority is high.

After that, if there is any resource left in the server group 2, the arrangement determination unit 22 places the virtual machine with a large ratio of internally-addressed traffic with a low priority in the server group 2. When there is no resource left in the server group 2 and there is any resource left in the server group 1, the arrangement determination unit 22 places the virtual machine whose ratio of internally-addressed traffic with a low priority is high in the server group 1 (step S37). If there is no resource left in both the server groups 1, 2, the arrangement determination unit 22 does not place the virtual machine whose ratio of the internally-addressed traffic with a low priority is high. When the placement of the virtual machines with a large ratio of traffic with a low priority is done, monitoring of the traffic information is started by the traffic monitor 25 (step S38).

The changing method of the arrangement of the virtual machines when congestion occurs after the operation of the virtual machines starts is similar to that in the first embodiment or the second embodiment. In the present embodiment, since data with a low priority is data of the best-effort type, even in a case in which the enough bandwidth for transmitting traffic with a low priority is not secured, the control apparatus 10 does not change the arrangement of the virtual machines. When congestion occurs in communication data with a high priority, the control apparatus 10 changes the arrangement of the virtual machines in a similar manner as in the first or the second embodiment. When changing the arrangement of the virtual machines, the arrangement determination unit 22 is supposed to determine the arrangement of the virtual machine whose ratio of traffic with a high priority is high in a similar manner as when the virtual machine whose ratio of traffic with a low priority is large is not placed. The virtual machine whose ratio of traffic with a low priority is high is rearranged in a similar method as in steps S36, S37 in FIG. 22 as needed, when the arrangement of the virtual machine whose ratio of traffic with a high priority is high is determined.

<Others>

The embodiments are not limited to those described above, and may be modified in various ways. Some examples are described below.

While a method to change the arrangement when congestion occurs is described in the explanation above, the arrangement determination unit 22 may also start the change of the arrangement using delay information. For example, the traffic monitor 25 may measure the delay time using a measurement packet including a time stamp, and may notify the control apparatus 10 of delay information with traffic information. When the delay time exceeds a prescribed threshold, the control apparatus 10 starts the change of the arrangement in a similar manner as when congestion occurs.

While the server group 1 included servers SV whose number of hops from the gateway is 1 and connected directly to the gateway in the example explained using the drawing, the network topology in the data center 60 may be changed arbitrarily according to the implementation. For example, the number of hops to the gateway from the server SV that is closest to the gateway may be any number equal to 2 or larger. Furthermore, the number of types of the number of hops from the gateway to the server SV may be any number equal to 2 or larger. For example, the control apparatus 10 may determine the arrangement of the virtual machines in three servers of the server group whose number of hops from the gateway is 2, the server group whose number of hops from the gateway is 5, and the server group whose number of hops from the gateway is 6. In this case, the virtual machines having large traffic addressed externally is placed in the server whose number of hops from the gateway is small, as much as possible. In addition, the virtual machines that communicate with each other in the data center 60 are placed in the servers connected to the same switch SW, as much as possible.

The threshold used for the judgment as to whether the ratio of externally-addressed traffic is large with respect to the total volume of the traffic may be a fixed value determined in advance. In this case, if the threshold is 50%, the virtual machine whose ratio of externally-addressed traffic is 60% is judged as having a large ratio of externally-addressed traffic.

While judgment is made that congestion has occurred when the calculated value of traffic flowing in a line exceeds the bandwidth of the line, the judgment as to whether congestion has occurred may also be made according to a threshold. In this case, the threshold is set to a value that is smaller than the bandwidth of the line, such as 90% of the bandwidth of the line. The communication may be made more efficient by changing the arrangement of the virtual machines before the communication quality deteriorates, by detecting congestion as described above.

Furthermore, the traffic monitor 25 and the control apparatus 10 do not need to be different apparatuses, and for example, the control apparatus 10 may have the traffic monitor 25 built inside. In this case, the traffic information obtaining unit 15 of the control apparatus 10 obtains traffic information from the traffic monitor 25 built inside.

The lines in the data center are used efficiently by the methods explained above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method comprising:
    relaying communication between a first server provided in a data center and an external communication apparatus located outside the data center, and relaying communication between a second server provided in the data center and the external communication apparatus, performed by a gateway apparatus over a network, wherein a first number of hops from the gateway apparatus to the first server is smaller than a second number of hops from the gateway apparatus to the second server;
    obtaining an observation result by observing a communication amount which is an amount of data transmitted or received per unit time for each of a plurality of virtual machines operating in the first and second servers in association with a transmission source and a destination of the data, and obtaining a delay time of the data measured by a measurement packet including a time stamp, performed by a control apparatus provided in the data center, wherein the control apparatus is communicatively coupled to the first and second servers;

detecting, by the control apparatus, that a second virtual machine operating in the second server, of the plurality of virtual machines, either having a larger communication amount with the external communication apparatus from among the plurality of virtual machines or having a longer delay time from among the plurality of virtual machines;

checking, by the control apparatus, whether any resources to operate an additional virtual machine are left in the first server;

judging, by the control apparatus that there are no resources left in the first server;

comparing, by the control apparatus, the communication amount with the external communication apparatus of a first virtual machine operating in the first server of the plurality of virtual machines, and the second virtual machine operating in the second server, and comparing, by the control apparatus, the delay time with the external communication apparatus of the first virtual machine operating in the first server and the second virtual machine operating in the second server;

when the control apparatus detects the first virtual machine either having a smaller communication amount or having a shorter delay time than the second virtual machine operating in the second server; and controlling, by the control apparatus, an arrangement of the virtual machines so that, the first virtual machine is moved from the first server to another server provided in the data center, and the second virtual machine is moved to the first server.

2. The communication method according to claim 1, wherein
the control apparatus calculates a communication amount of a route from the second server to the gateway using the observation result; and
controls arrangement of the virtual machine placed in the second server, when the communication amount of the route from the second server to the gateway apparatus exceeds a first threshold, and the virtual machine whose communication amount with the external communication apparatus is larger among the virtual machines placed in the second server is moved to the first server with priority.

3. The communication method according to claim 1, wherein
when a ratio of a communication amount of a first virtual machine and the external communication apparatus with respect to a communication amount of the first virtual machine is equal to or below a second threshold, the control apparatus control the first virtual machine to be placed in the second server.

4. The communication method according to claim 1, wherein
when the ratio of the communication amount with the external communication apparatus is equal to or below the second threshold in both the first virtual machine and the second virtual machine, and, when communication is performed between the first virtual machine and the second virtual machine, the control apparatus arranges the first and second virtual machines so that the number of hops between the first virtual machine and the second virtual machine becomes small.

5. The communication method according to claim 1, wherein
the observation result includes a result of observation of an amount of data transmitted or received for each of the virtual machines operating on the first and second servers in association with a degree of priority, and the control apparatus performs control so that among the virtual machines transmitting or receiving data with a high degree of the priority, the virtual machine whose communication amount with the external communication apparatus is larger is to be placed in the first server.

6. A non-transitory computer-readable storage medium having stored therein a program, the program making a computer execute a process comprising:
obtaining a first number of hops being a number of hops to a first server in a data center from a gateway apparatus relaying communication between an apparatus located inside the data center and an external communication apparatus located outside the data center;
obtaining a second number of hops being a number of hops from the gateway apparatus to a second server in the data center;
obtaining an observation result by observing a communication amount which is an amount of data transmitted or received per unit time for each of a plurality of virtual machines operating in the first and second servers in association with a transmission source and a destination of the data and obtaining a delay time measured by a measurement packet including a time stamp, performed by a control apparatus provided in the data center, wherein the control apparatus is communicatively coupled to the first and second servers;
checking, by the control apparatus, whether any resources to operate an additional virtual machine are left in the first server, when a second virtual machine is detected either having a larger communication amount with the external communication apparatus from among the plurality of virtual machines operating in the second server or having a longer delay time from among the plurality of virtual machines operating in the second server, and when the first number of hops is smaller than the second number of hops;
comparing, by the control apparatus, the communication amount with the external communication apparatus of a first virtual machine operating in the first server of the plurality of virtual machines, and the second virtual machine operating in the second server, and comparing, by the control apparatus, the delay time with the external communication apparatus of the first virtual machine operating in the first server and the second virtual machine operating in the second server, when the control apparatus judges that there are no resources left in the first server; and
controlling, by the control apparatus, an arrangement of the virtual machines so that, when the control apparatus detects the first virtual machine either having a smaller communication amount or having a shorter delay time than the second virtual machine operating in the second server, the first virtual machine is moved from the first server to another server provided in the data center, and the second virtual machine is moved to the first server.

7. A communication apparatus comprising:
a memory
storing a first number of hops being a number of hops to a first server in a data center from a gateway apparatus relaying communication between an apparatus located inside the data center and an external communication apparatus located outside the data center and a second number of hops being a number of hops from the gateway apparatus to a second server in the data center;

a network connection apparatus configured to:
receiving an observation result obtained by observing a communication amount which is an amount of data transmitted or received per unit time for each of a plurality of virtual machines operating in the first and second servers in association with a transmission source and a destination of the data, and receiving a delay time measured by a measurement packet including a time stamp, performed by a control apparatus provided in the data center, wherein the control apparatus is communicatively coupled to the first and second servers; and a processor configured to:
detecting, by the control apparatus, a second virtual machine either having a larger communication amount with the external communication apparatus from among the plurality of virtual machines operating in the second server or having a longer delay time from among the plurality of virtual machines operating in the second server, checking, by the control apparatus, whether the first server has any resources left to operate another virtual machine, comparing, by the control apparatus, the communication amount with the external communication apparatus of a first virtual machine operating in the first server of the plurality of virtual machines, and the second virtual machine operating in the second server, and comparing, by the control apparatus, the delay time with the external communication apparatus of the first virtual machine operating in the first server and the delay time with the external communication apparatus of the second virtual machine operating in the second server, when the first server has no resources left, determining an arrangement of the virtual machines so that, when a first virtual machine either has a smaller communication amount or has a shorter delay time than a second virtual machine operating in the second server, the first virtual machine is moved from the first server to another server provided in the data center, and the second virtual machine is moved to the first server, and generating a control message for notification of a determined arrangement;

wherein the network connection apparatus transmits the control message.

* * * * *